US012438258B2

(12) United States Patent
Liu et al.

(10) Patent No.: US 12,438,258 B2
(45) Date of Patent: Oct. 7, 2025

(54) BASE STATION ANTENNAS

(71) Applicant: Outdoor Wireless Networks LLC, Claremont, NC (US)

(72) Inventors: Nengbin Liu, Jiangsu (CN); Xun Zhang, Jiangsu (CN); PuLiang Tang, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 273 days.

(21) Appl. No.: 18/307,859

(22) Filed: Apr. 27, 2023

(65) Prior Publication Data

US 2024/0039145 A1 Feb. 1, 2024

(30) Foreign Application Priority Data

Jun. 1, 2022 (CN) ........................ 202210616569.5

(51) Int. Cl.

*H01Q 1/24* (2006.01)
*H01Q 15/00* (2006.01)
*H01Q 21/06* (2006.01)
*H01Q 1/42* (2006.01)

(52) U.S. Cl.

CPC ......... *H01Q 1/246* (2013.01); *H01Q 15/0013* (2013.01); *H01Q 21/062* (2013.01); *H01Q 1/42* (2013.01)

(58) Field of Classification Search

CPC .. H01Q 1/246; H01Q 15/0013; H01Q 21/062; H01Q 1/42; H01Q 5/385; H01Q 21/26
See application file for complete search history.

(56) References Cited

U.S. PATENT DOCUMENTS

| | | | |
|---|---|---|---|
| 5,184,145 | A | 2/1993 | Devillers et al. |
| 5,451,969 | A | 9/1995 | Toth et al. |
| 5,982,339 | A | 11/1999 | Lalezari et al. |
| 6,025,812 | A | 2/2000 | Gabriel et al. |
| 6,339,047 | B1 | 1/2002 | Christopherson et al. |
| 6,388,637 | B1 | 5/2002 | Davis |
| 6,831,615 | B2 | 12/2004 | Goettl |
| 7,679,576 | B2 | 3/2010 | Riedel et al. |
| 7,907,096 | B2 | 3/2011 | Timofeev et al. |
| 7,999,752 | B2 | 8/2011 | Riedel |

(Continued)

FOREIGN PATENT DOCUMENTS

| | | | |
|---|---|---|---|
| CN | 1886864 | A | 12/2006 |
| CN | 100492763 | C | 5/2009 |

(Continued)

OTHER PUBLICATIONS

Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.

(Continued)

*Primary Examiner* — Hai V Tran
(74) *Attorney, Agent, or Firm* — Myers Bigel, P.A.

(57) ABSTRACT

Base station antennas include a base station antenna housing with first plurality of struts with pairs of laterally extending forward and rearward arms coupled to spaced apart left and right side reflector strip segments that extend in a longitudinal direction along a portion of a length of the base station antenna housing.

26 Claims, 16 Drawing Sheets

(56) References Cited

U.S. PATENT DOCUMENTS

| | | | |
|---|---|---|---|
| 10,396,460 B2 | 8/2019 | Kosaka et al. | |
| 10,978,840 B2 | 4/2021 | Paynter et al. | |
| 11,070,269 B2 | 7/2021 | Lee et al. | |
| 11,482,774 B2 | 10/2022 | Hou et al. | |
| 11,581,631 B2 | 2/2023 | Li et al. | |
| 11,652,300 B2 | 5/2023 | Li et al. | |
| 11,658,372 B2 | 5/2023 | Kosaka | |
| 11,749,881 B2 | 9/2023 | Hou et al. | |
| 2004/0169612 A1 | 9/2004 | Song et al. | |
| 2004/0201542 A1* | 10/2004 | Gottl | H01Q 21/0087 343/912 |
| 2004/0259597 A1 | 12/2004 | Gothard et al. | |
| 2005/0134522 A1 | 6/2005 | Waltho | |
| 2005/0179610 A1* | 8/2005 | Le | H01Q 21/28 343/797 |
| 2005/0264463 A1 | 12/2005 | Gottl et al. | |
| 2006/0273865 A1* | 12/2006 | Timofeev | H01Q 3/36 333/161 |
| 2007/0229385 A1 | 10/2007 | Deng et al. | |
| 2007/0241979 A1 | 10/2007 | Yang | |
| 2008/0036674 A1 | 2/2008 | Riedel et al. | |
| 2009/0135076 A1 | 5/2009 | Foo | |
| 2009/0224994 A1 | 9/2009 | Le et al. | |
| 2012/0075155 A1 | 3/2012 | Lindmark et al. | |
| 2012/0087284 A1 | 4/2012 | Linehan et al. | |
| 2012/0280874 A1 | 11/2012 | Kim et al. | |
| 2013/0234883 A1 | 9/2013 | Ma et al. | |
| 2014/0313095 A1 | 10/2014 | Pu et al. | |
| 2015/0084823 A1 | 3/2015 | Wang et al. | |
| 2015/0097739 A1 | 4/2015 | Samuel | |
| 2015/0263424 A1 | 9/2015 | Sanford et al. | |
| 2016/0365618 A1 | 12/2016 | Kim et al. | |
| 2016/0372839 A1 | 12/2016 | Watson et al. | |
| 2017/0040665 A1 | 2/2017 | Takashima et al. | |
| 2017/0040679 A1 | 2/2017 | Fröhler et al. | |
| 2017/0099041 A1 | 4/2017 | Wall | |
| 2017/0170549 A1 | 6/2017 | Buondelmonte | |
| 2018/0040948 A1 | 2/2018 | Göttl et al. | |
| 2018/0269577 A1 | 9/2018 | Kosaka et al. | |
| 2018/0290356 A1 | 10/2018 | Isohätälä et al. | |
| 2018/0323513 A1 | 11/2018 | Varnoosfaderani et al. | |
| 2018/0331419 A1* | 11/2018 | Varnoosfaderani | H01Q 13/10 |
| 2019/0123426 A1 | 4/2019 | Bryce | |
| 2019/0173162 A1 | 6/2019 | Farzaneh et al. | |
| 2019/0181557 A1 | 6/2019 | Isik et al. | |
| 2019/0190146 A1 | 6/2019 | Hand et al. | |
| 2019/0267700 A1 | 8/2019 | Hendrix et al. | |
| 2019/0267701 A1 | 8/2019 | Kim et al. | |
| 2019/0268046 A1 | 8/2019 | Kim et al. | |
| 2019/0312338 A1 | 10/2019 | Guntupalli et al. | |
| 2019/0312394 A1 | 10/2019 | Paynter et al. | |
| 2019/0372204 A1* | 12/2019 | Varnoosfaderani | H01Q 1/523 |
| 2019/0393597 A1 | 12/2019 | Kosaka et al. | |
| 2020/0076079 A1 | 3/2020 | Shan et al. | |
| 2020/0099139 A1 | 3/2020 | Rebegea et al. | |
| 2020/0288495 A1 | 9/2020 | Gao et al. | |
| 2020/0321700 A1 | 10/2020 | Wu et al. | |
| 2021/0057801 A1 | 2/2021 | Zhao et al. | |
| 2021/0075092 A1* | 3/2021 | Su | H01Q 1/427 |
| 2021/0218156 A1 | 7/2021 | Patel et al. | |
| 2021/0226344 A1 | 7/2021 | Wu et al. | |
| 2021/0305717 A1 | 9/2021 | Hou et al. | |
| 2021/0305718 A1 | 9/2021 | Li et al. | |
| 2022/0021123 A1 | 1/2022 | Koul et al. | |
| 2022/0102842 A1 | 3/2022 | Li et al. | |
| 2022/0285858 A1 | 9/2022 | Xiao et al. | |
| 2023/0056237 A1 | 2/2023 | Hou et al. | |
| 2023/0104131 A1* | 4/2023 | Varnoosfaderani | H01Q 21/062 343/702 |
| 2023/0208051 A1* | 6/2023 | Zhang | H01Q 19/104 343/702 |
| 2023/0352811 A1 | 11/2023 | Ponn et al. | |
| 2023/0361452 A1 | 11/2023 | Hou et al. | |
| 2023/0395971 A1* | 12/2023 | Yin | H01Q 21/062 |
| 2024/0014545 A1 | 1/2024 | Huang et al. | |
| 2024/0186711 A1 | 6/2024 | Li et al. | |
| 2024/0372248 A1 | 11/2024 | Liu et al. | |

FOREIGN PATENT DOCUMENTS

| | | | |
|---|---|---|---|
| CN | 201528038 | U | 7/2010 |
| CN | 101950846 | A | 1/2011 |
| CN | 201893434 | U | 7/2011 |
| CN | 102800956 | A | 11/2012 |
| CN | 103490175 | A | 1/2014 |
| CN | 103715521 | A | 4/2014 |
| CN | 104319486 | A | 1/2015 |
| CN | 206225553 | U | 6/2017 |
| CN | 107453044 | A | 12/2017 |
| CN | 107834198 | A | 3/2018 |
| CN | 108242596 | A | 7/2018 |
| CN | 109219905 | A | 1/2019 |
| CN | 110323564 | A | 10/2019 |
| CN | 111129769 | A | 5/2020 |
| CN | 107459805 | B | 11/2020 |
| CN | 111989824 | A | 11/2020 |
| CN | 112201939 | A | 1/2021 |
| CN | 215418610 | U | 1/2022 |
| CN | 114094347 | A | 2/2022 |
| EP | 0982800 | A2 | 3/2000 |
| EP | 1204161 | A1 | 5/2002 |
| EP | 2784876 | A1 | 10/2014 |
| EP | 2827449 | A2 | 1/2015 |
| EP | 3544204 | A2 | 9/2019 |
| EP | 3614491 | A1 | 2/2020 |
| EP | 3751665 | A1 | 12/2020 |
| EP | 3966898 | A2 | 3/2022 |
| JP | S6081902 | A | 5/1985 |
| JP | 2006108841 | A | 4/2006 |
| KR | 102129787 | B1 | 7/2020 |
| WO | 9700586 | A1 | 1/1997 |
| WO | 2009061966 | A1 | 5/2009 |
| WO | 2011160649 | A2 | 12/2011 |
| WO | 2011160849 | A1 | 12/2011 |
| WO | 2013016939 | A1 | 2/2013 |
| WO | 2019100325 | A1 | 5/2019 |
| WO | 2019154362 | A1 | 8/2019 |
| WO | 2019236203 | A2 | 12/2019 |
| WO | 2020010039 | A1 | 1/2020 |
| WO | 2020072880 | A1 | 4/2020 |
| WO | 2020159902 | A1 | 8/2020 |
| WO | 2021150384 | A1 | 7/2021 |
| WO | 2021195040 | A2 | 9/2021 |
| WO | 2021222217 | A1 | 11/2021 |
| WO | 2022055764 | A1 | 3/2022 |
| WO | 2023029431 | A1 | 3/2023 |

OTHER PUBLICATIONS

Chang et al. "Equivalent Circuit Modeling of Active Frequency Selective Surfaces" Radio and Wireless Symposium, pp. 663-666 (2008).

He, Yejun , et al., "Novel Dual-Band, Dual-Polarized, Miniaturized and Low-Profile Base Station Antenna", IEEE Transactions on Antennas and Propagation, vol. 63, No. 12, Dec. 2015, 5399-5408.

Joozdani et al. "Equivalent Circuit Model of Frequency Selective Surfaces Embedded in Non-homogeneous Dielectric Slab" 24th Iranian Conference on Electrical Engineering (ICEE), pp. 380-383 (2016).

Shepard et al. "Argos: Practical Many-Antenna Base Stations" Proceedings of the 18th Annual International Conference on Mobile Computing and Networking (12 pages) (Aug. 26, 2012).

Vasquez-Peralvo et al. "Inductive Frequency Selective Surface: An Application for Dichroic Sub-Reflectors" IEEE Access, vol. 8, pp. 22721-22732 (2020).

* cited by examiner

BASE STATION ANTENNAS

RELATED APPLICATIONS

This patent application claims the benefit of and priority to Chinese Patent Application Serial Number 202210616569.5, filed Jun. 1, 2022, the contents of which are hereby incorporated by reference as if recited in full herein.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. In order to increase capacity without further increasing the number of base station antennas, multi-band base station antennas have been introduced which include multiple linear arrays of radiating elements. Additionally, base station antennas are now being deployed that include "beamforming" arrays of radiating elements that include multiple columns of radiating elements that are connected to respective ports of a radio so that the antenna may perform active beamforming (i.e., the shapes of the antenna beams generated by the antenna may be adaptively changed to improve the performance of the antenna). In some cases, the radios for these beamforming arrays may be integrated into the antenna. These beamforming arrays typically operate in higher frequency bands, such as various portions of the 3.1-5.8 GHz frequency band. Antennas having integrated radios that can adjust the amplitude and/or phase of the sub-components of an RF signal that are transmitted through individual radiating elements or small groups thereof are referred to as "active antennas." Active antennas can generate narrowed beamwidth, high gain, antenna beams and can steer the generated antenna beams in different directions by changing the amplitudes and/or phases of the sub-components of RF signals that are transmitted through the antenna.

Further details of example conventional antennas can be found in co-pending WO2019/236203 and WO2020/072880, the contents of which are hereby incorporated by reference as if recited in full herein.

With the development of wireless communication technology, an integrated base station antenna including a passive antenna device and active antenna device has emerged. The passive antenna device may include one or more arrays of radiating elements that are configured to generate relatively static antenna beams, such as antenna beams that are configured to cover a 120-degree sector (in the azimuth plane) of an integrated base station antenna. The arrays may include arrays that operate, for example, under second generation (2G), third generation (3G) and/or fourth generation (4G) cellular network standards. These arrays are not configured to perform active beamforming operations, although they typically have remote electronic tilt (RET) capabilities which allow the shape of the antenna beam to be changed via electromechanical means in order to change the coverage area of the antenna beam. The active antenna device may include one or more arrays of radiating elements that operate under fifth generation (5G or higher version) cellular network standards. In 5G mobile communication, the frequency range of communication includes a main frequency band (specific portion of the range 450 MHz-6 GHz) and an extended frequency band (24 GHz-73 GHz, i.e., millimeter wave frequency band, mainly 28 GHz, 39 GHz, 60 GHz and 73 GHz). The frequency range used in 5G mobile communication includes frequency bands that use higher frequencies than the previous generations of mobile communication. These arrays typically have individual amplitude and phase control over subsets of the radiating elements therein and perform active beamforming.

The active antenna device is capable of emitting high-frequency electromagnetic waves (for example, high-frequency electromagnetic waves in the 2.3-4.2 GHz frequency band or a portion thereof). At least a portion of the active antenna device is typically mounted rearwardly of the passive antenna device. Electromagnetic waves are transmitted through a front radome of the active antenna device and through a rear radome and front radome of the passive antenna device, which may hinder wave transmission of, for example, high-frequency electromagnetic waves emitted by the active antenna device.

SUMMARY

Embodiments of the present invention are directed to base station antennas with laterally extending struts that couple to right and left side strip segments of a reflector.

The laterally extending struts can have a forward arm and a rearward arm. The rearward arm can be configured to couple to the right and left side strip segments of the reflector.

The laterally extending struts can support one or more matching layers.

The base station antennas can include a plurality of substrates comprising a plurality of longitudinally spaced apart conductive members, one substrate coupled to a set of longitudinally aligned open channels defined by aligned struts.

The structs can couple to U-shaped segments of the reflector.

The base station antennas can have a respective housing having a rear panel of a different material and/or that is thinner than a front radome thereof.

The rear panel can define a portion of a rear radome with a lower dielectric constant relative to the front radome.

The base station antenna can include a frequency selective surface (FSS).

The FSS can be configured to allow high band radiating elements to propagate electromagnetic waves therethrough and reflect lower band RF signals transmitted by lower band radiating elements projecting forward of the FSS.

The FSS can be provided, for example, by a printed circuit board defining a metal grid pattern (of metal patches), a sheet of metal provided with a grid pattern or a plastic substrate with a metallized grid pattern.

Embodiments of the present invention are directed to a base station antenna that includes a base station antenna housing having a front radome and a rear. The rear includes an open space that extends longitudinally a sub-length of the base station antenna housing and that extends laterally across at least 50% of a width of the base station antenna housing. The base station antenna also includes a passive antenna assembly in the base station antenna housing The passive antenna assembly can have a main reflector portion that merges into a pair of laterally spaced apart right and left side reflector strips that face each other across an open space therebetween. At least a portion of the rear panel can extend in front of or behind the open space.

The reflector strips can reside in a plane that is behind a plane of the main reflector portion.

Low band radiating elements can project forward of the FSS.

Other aspects of the present invention are directed to base station antennas that include: a base station antenna housing with a front radome and a rear; a passive antenna assembly in the base station antenna housing; and a plurality of struts that are longitudinally spaced apart inside the base station antenna housing. At least some of the plurality of struts have a forward arm and a rearward arm, each of the forward and rearward arms extending laterally across the base station antenna. The base station antennas also include a matching layer coupled to at least one of the forward arm or the rearward arm of a first of the plurality of struts.

The base station antenna can also include a reflector inside the base station antenna housing. At least some of the plurality of struts can be coupled to the reflector.

The reflector can have left and right side reflector strip segments that extend in a longitudinal direction along a portion of a length of the base station antenna housing. The rearward arm of the first of the plurality of struts can be attached to the left and right side reflector strip segments.

The reflector can have right and left side U-shaped segments and the rearward arm of the first of the plurality of struts can be attached to the right and left side U-shaped segments.

The rearward arm of the first of the plurality of struts can have a lip that extends rearwardly and one side of the U-shaped segments can extend forward to be coupled to the lip.

The matching layer can be provided as a first matching layer and a second matching layer. The first matching layer can be coupled to the forward arm of the first of the plurality of struts and the second matching layer can be coupled to the rearward arm of the first of the plurality of struts.

The forward arm of the first of the plurality of struts can have a plurality of laterally spaced apart coupling segments. The first matching layer can have a plurality of laterally spaced apart fastener segments that couple to the coupling segments.

The forward arm and/or the rearward arm of the first of the plurality of struts can have a laterally extending slot and the at least one matching layer can extend through the laterally extending slot.

The matching layer can be provided as a plurality of matching layer segments arranged in rows, columns or rows and columns.

The rearward arm of the first of the plurality of struts can have a plurality of laterally spaced apart open channels. The base station antenna can further include a plurality of substrates providing a plurality of longitudinally spaced apart conductive members. One substrate can be coupled to each set of longitudinally aligned open channels.

The substrates can be printed circuit boards.

One of the plurality of laterally spaced apart open channels of the rearward arm of the first of the plurality of struts can include laterally extending attachment features that couple to one substrate of the plurality of substrates.

The substrates can have apertures and wherein the attachment features of the rearward arm of the first of the plurality of struts can extend through the apertures of the one substrate.

The conductive members can be planar and can define parasitic tuning elements.

The base station antenna can also include an active antenna unit that can be coupled to the rear of the base station antenna housing.

The rear can have a closed surface.

The rear can have an open space that extends longitudinally a sub-length of the base station antenna housing and that extends laterally across at least 50% of a width of the base station antenna housing. The base station antenna can also include a rear panel sealably coupled to the rear of the base station antenna housing and positioned to cover the open space. The rear panel can be formed of a different material than the front radome or can be formed of a material that is the same but thinner than the front radome.

The base station antenna can also include at least one frequency selective surface (FSS) that can be inside the base station antenna housing and that can be configured to reflect or block electromagnetic waves from radiating elements of the passive antenna assembly and allow higher band electromagnetic waves to travel therethrough toward the front radome.

The base station antenna can further include an active antenna unit that can be coupled to the base station antenna housing. The active antenna unit can have an array of radiating elements facing the FSS. The array of radiating elements of the active antenna unit can be configured to propagate RF energy through the rear.

The at least one FSS can include an FSS that can be configured to allow RF energy to pass through at one or more defined frequency range and reflect RF energy at a different frequency band.

Still other embodiments are directed to base station antenna assemblies that include: a base station antenna housing having a front radome; a plurality of columns of first radiating elements configured for operating in a first operational frequency band inside the base station antenna housing, each column of first radiating elements including a plurality of first radiating elements arranged in a longitudinal direction; and a first plurality of struts that are longitudinally spaced apart inside the base station antenna housing; and a second plurality of struts that are longitudinally spaced apart inside the base station antenna housing and positioned below the first plurality of struts. The first plurality of struts have a different configuration than the second plurality of struts.

Each of the first plurality of struts can have a forward arm and a rearward arm spaced apart with an open space therebetween and each of the forward and rearward arms can extend laterally across the base station antenna.

The first plurality of struts can support at least one matching layer.

The first plurality of struts can support a first matching layer and a second matching layer. The forward arm can support the first matching layer and the rearward arm can support the second matching layer.

The base station antenna can also include a plurality of longitudinally extending substrates, each substrate can have a plurality of conductive members that are longitudinally spaced apart. Each substrate can be coupled to the first plurality of struts and can terminate above the second plurality of struts.

The base station antenna can further include a reflector inside the base station antenna housing. The reflector can have left and right side reflector strip segments that extend in a longitudinal direction along a portion of a length of the base station antenna housing. The rearward arms of the first plurality of struts can be coupled to the left and right side reflector strip segments.

The reflector can have right and left side U-shaped segments and the rearward arm of the first plurality of struts can be attached to the right and left side U-shaped segments.

The rearward arm of the first plurality of struts can have a lip that extends rearwardly and one side of the U-shaped segments extends forward and can be coupled to the lip.

The forward arm can have a plurality of laterally spaced apart coupling segments. The base station antenna can further include a first matching layer that has a plurality of laterally spaced apart fastener segments that couple to the coupling segments.

The forward arm and/or the rearward arm can have a laterally extending slot. At least one matching layer can extend through the laterally extending slot of the first plurality of struts and can terminate above the second plurality of struts.

The base station antenna can further include at least one matching layer coupled to the first plurality of struts. The at least one matching layer can be provided as a plurality of matching layer segments.

The base station antenna can further include a frequency selective surface (FSS) that can reside behind a first matching layer and the plurality of columns of first radiating elements. The FSS can be configured to reflect electromagnetic waves within a first operational frequency band.

The FSS can be further configured such that electromagnetic waves within a second operational frequency band can propagate through the FSS.

The second operational frequency band can be higher than the first operational frequency band. The plurality of columns of second radiating elements can be provided by an active antenna unit coupled to the base station antenna housing.

DETAILED DESCRIPTION

Embodiments of the present invention are directed to base station antennas. In the description that follows, these base station antennas will be described using terms that assume that the base station antenna is mounted for use on a tower, pole or other mounting structure with the longitudinal axis of the base station antenna extending along a vertical axis and the front of the base station antenna mounted opposite the tower, pole or other mounting structure pointing toward the target coverage area for the base station antenna. It will be appreciated that the base station antennas may not always be mounted so that the longitudinal axes thereof extend along a vertical axis. For example, the base station antennas may be tilted slightly (e.g., less than 10°) with respect to the vertical axis so that the resultant antenna beams formed by the base station antennas each have a small mechanical downtilt.

Figure 1:
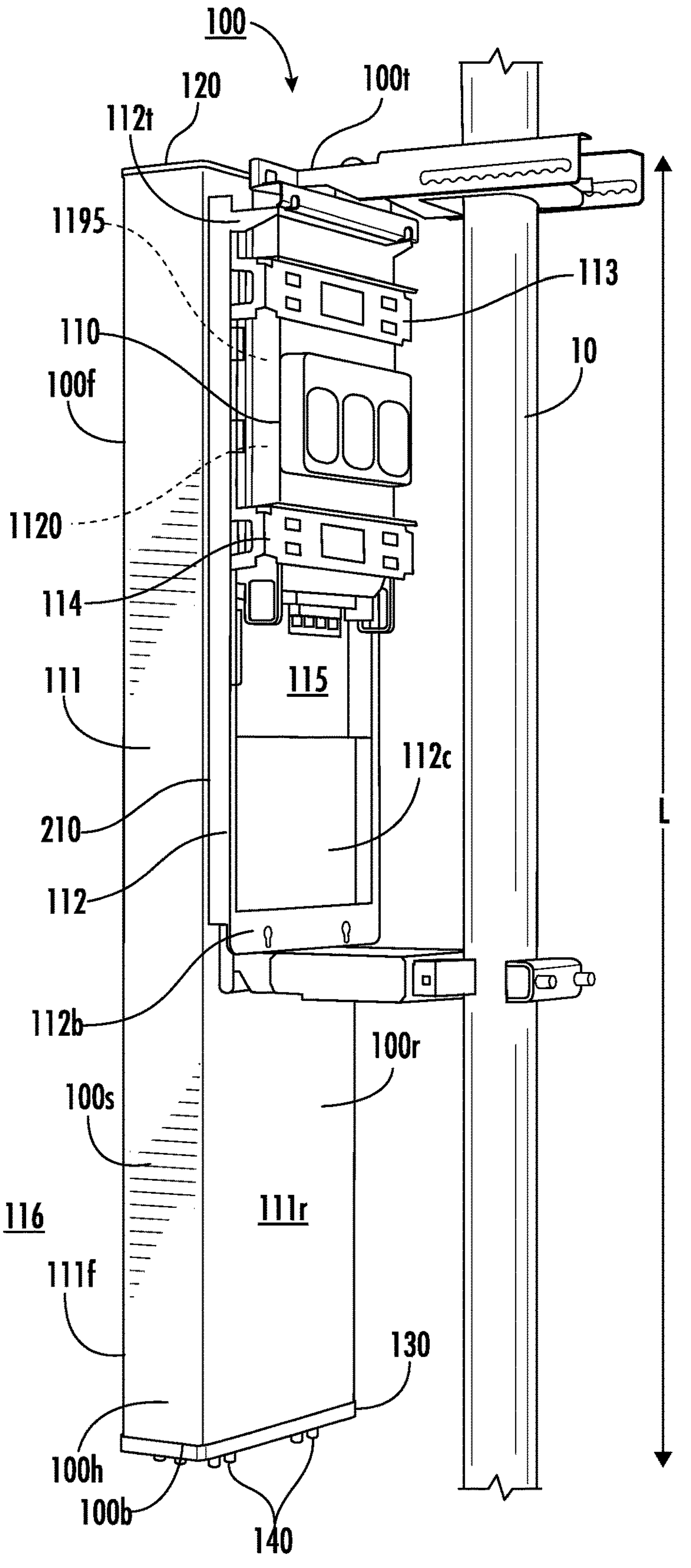
FIG. 1 is a rear, side perspective view a base station antenna comprising an active antenna module coupled to a housing enclosing a passive antenna assembly according to embodiments of the present invention.

FIG. 1 illustrates a base station antenna 100. The base station antenna 100 has a housing **100*h* that holds a passive antenna assembly 190 (FIGS. 2, 3) and that can couple to or include at least one active antenna module 110. The term "active antenna module" is used interchangeably with "active antenna unit" and "AAU" and refers to a cellular communications unit comprising radio circuitry 1120 and associated radiating elements 1195. The radio circuitry is capable of electronically adjusting the amplitude and/or phase of the subcomponents of an RF signal that are output to different radiating elements of an array of radiating elements or groups thereof. The active antenna module 110 may include both the radio circuitry and a radiating element array (e.g., a multi-input-multi-output (mMIMO) beamforming antenna array) and may include other components such as filters, a calibration network, an antenna interface signal group (AISG) controller and the like. The active antenna module 110 can be provided as a single integrated unit or provided as a plurality of stackable units, including, for example, first and second sub-units such as a radio sub-unit (box) with the radio circuitry and an antenna sub-unit (box) with a multi-column array of radiating elements. The first and second sub-units can stackably attach together, in a front to back direction of the base station antenna 100, with the radiating element array 1195 closer to the front 111***f* of the housing 100*h*/radome 111 of base station antenna 100 than the radio circuitry unit 1120. The rear surface 100*r* of the base station antenna housing 100*h* can have a pair of rails 210 that can be used to mount the active antenna module 110 thereto. The rails 210 can be longitudinally extending rails but laterally extending rails or combinations of laterally extending and longitudinally extending rails may be provided, where such rails are used. A frame 112 can be used with brackets 113, 114, 116 to mount the AAU 110 to the housing 100*h* via the rails 210. The frame 112 can have an open space 112*c* between the two outer sides and can extend a sub length of the frame 112 between top and bottom portions 112*t*, 112*b*, respectively. A metal cover 115 can be formed by or coupled to the frame 112 and can reside above the open space 112*c*. Other mounting configurations are contemplated as will be appreciated by those of skill in the art.

As will be discussed further below, the base station antenna 100 includes an antenna assembly 190 (FIGS. 2, 3, 9) inside the housing 100*h*, which can be referred to as a "passive antenna assembly". The term "passive antenna assembly" refers to an antenna assembly having one or more arrays of radiating elements that are coupled to radios that are external to the antenna assembly, typically remote radio heads that are mounted in close proximity to the base station antenna housing 100*h*. The arrays of radiating elements included in the passive antenna assembly 190 (FIG. 2) are configured to form static antenna beams (e.g., antenna beams that are each configured to cover a sector of a base station). The passive antenna assembly 190 may comprise a backplane provided by a reflector 170, with radiating elements 222 projecting in front of the reflector and the radiating elements can include one or more linear arrays of low band radiating elements that operate in all or part of the 617-960 MHz frequency band and/or one or more linear arrays of mid-band radiating elements that operate in all or part of the 1427-2690 MHz frequency band. The passive antenna assembly 190 (FIG. 2) is mounted in the housing 100*h* of base station antenna 100 and one or more active antenna modules 110 can releasably (detachably) couple (e.g., directly or indirectly attach) to a back of the base station antenna housing 100*h*.

Referring to FIG. 1, the base station antenna housing 100*h* may be substantially rectangular with a flat rectangular cross-section. At least a front side 100*f* of the housing 100*h* may be implemented as a radome 111 providing a front radome 111*f*. A "radome" refers to a dielectric cover that allows RF energy to pass through in certain frequency bands. A rear 100*r* of the housing 100*h* may also include a rear radome 111*r* that is opposite the front radome 111*f*. Optionally, the housing 100*h* and/or the radome 111 can also comprise two (narrow) sidewalls 100*s* providing side radomes 111*s* facing each other and extending rearwardly between the front radome 111*f* and the rear radome 111*r*. The sidewalls 100*s*, 111*s* can have a width, measured in a front-to-back direction, that is 40%-90% less than a lateral extent of the housing 100*h*.

The top side 100*t* of the housing 100*h* may be sealed in a waterproof manner and may comprise an end cap 120 and the bottom side 100*b* of the housing 100*h* may be sealed with a separate end cap 130 with RF ports 140.

The front side 100*f*, at least part of the sidewalls 100*s* and typically at least part of the rear 100*r* of the housing 100*h* are typically implemented as radomes that are substantially transparent to RF energy within the operating frequency bands of the passive antenna assembly 190 and active antenna module 110. At least part of the radome 111 may be formed of, for example, fiberglass or plastic.

Radiation (electromagnetic waves) transmitted by the array of radiating elements 1195 in the active antenna unit 110 can transmit through a front radome of the active antenna module 110, enter the housing 100*h* from the back 100*r* and transmit out the front radome 111*f*, thus traveling through at least three radome walls spaced apart in a front-to-back direction. Active antenna modules 110 are often configured to operate using time division duplexing multiple access schemes in which the transmit and receive signals do not overlap in time, but instead the active antenna module transmits RF signals during selected time slots and receives RF signals during other time slots. The passive antenna assembly 190 can operate under frequency division duplexing (FDD) multiple access schemes.

Figure 2:
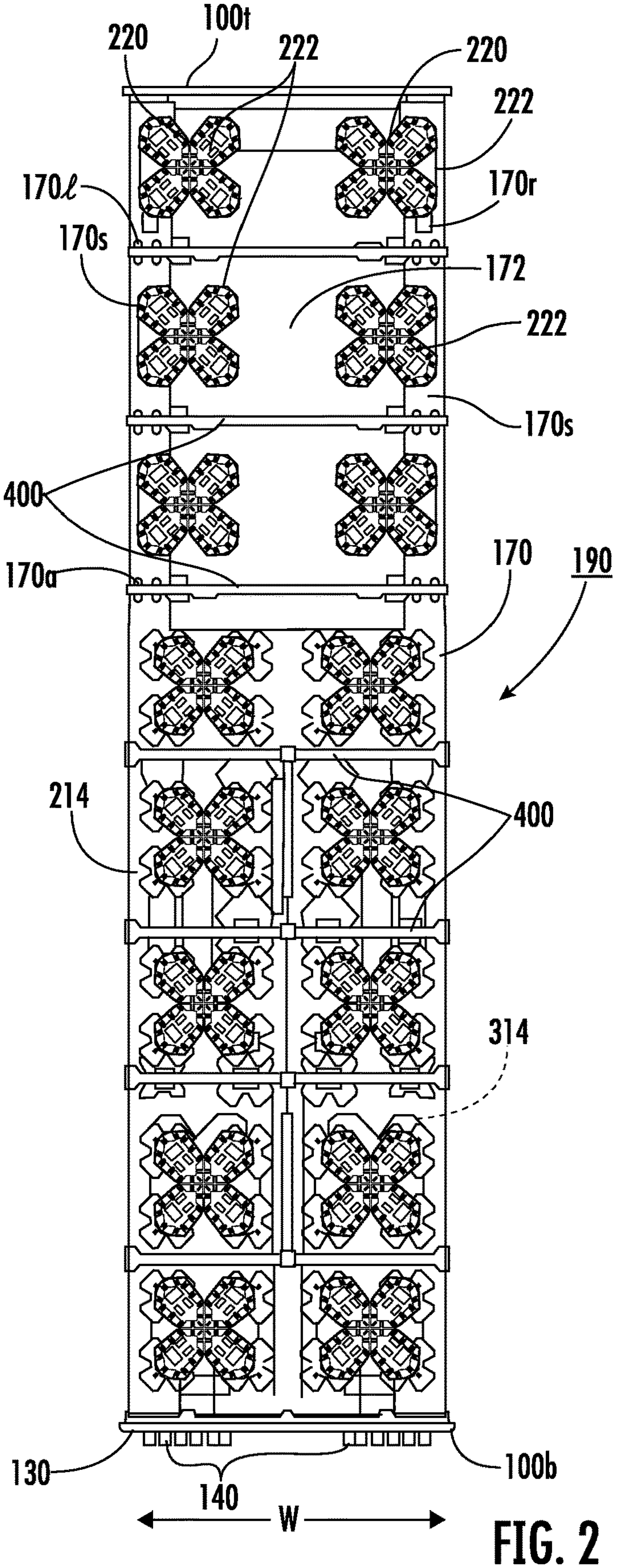
FIG. 2 is a front view of the passive antenna assembly shown in FIG. 1.

Referring to FIG. 2, a passive antenna assembly 190 is shown with a reflector 170 in the housing 100*h*. The reflector 170 can have a portion with longitudinally extending right and left strip segments 170*r*, 170*l* (right and left directions are based on directions when looking from a front 100*f* of the base station antenna 100) separated by an open space 172 that extends laterally and longitudinally between the strip segments 170*r*, 170*l*. The open space 172 between right and left side reflector segments 170*r*, 170*l* can reside in front of the rear 100*r* of the housing and can also reside in front of radiating elements 1195 of the (mMIMO array) of the active antenna module 110 (FIG. 1).

Figure 6A:
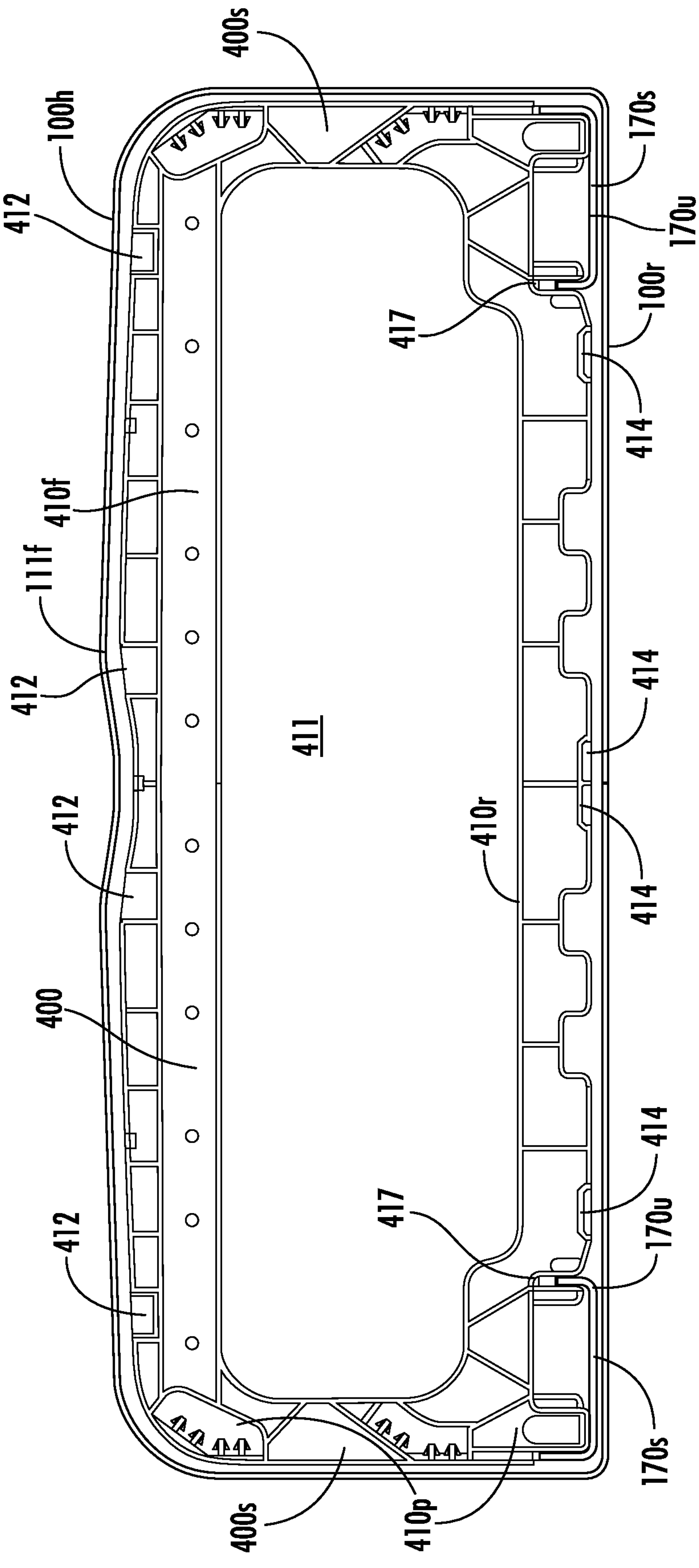
FIG. 6A is a lateral section view of a portion of the base station antenna housing illustrating various of the components shown in FIG. 4 according to embodiments of the present invention.
Figure 6B:
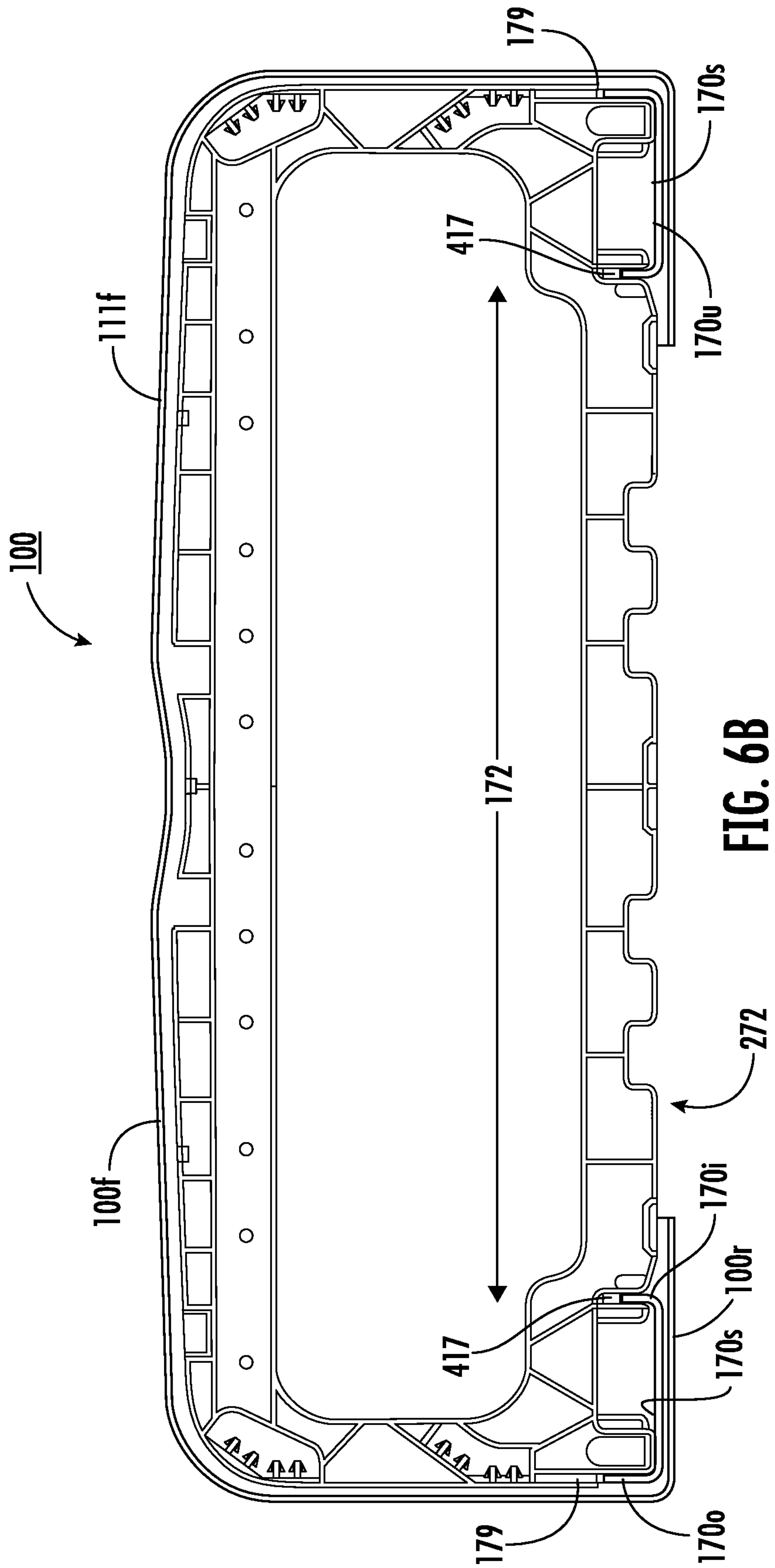
FIG. 6B is a lateral section view of a portion of the base station antenna housing illustrating another embodiment of the base station antenna housing according to embodiments of the present invention.
Figure 7A:
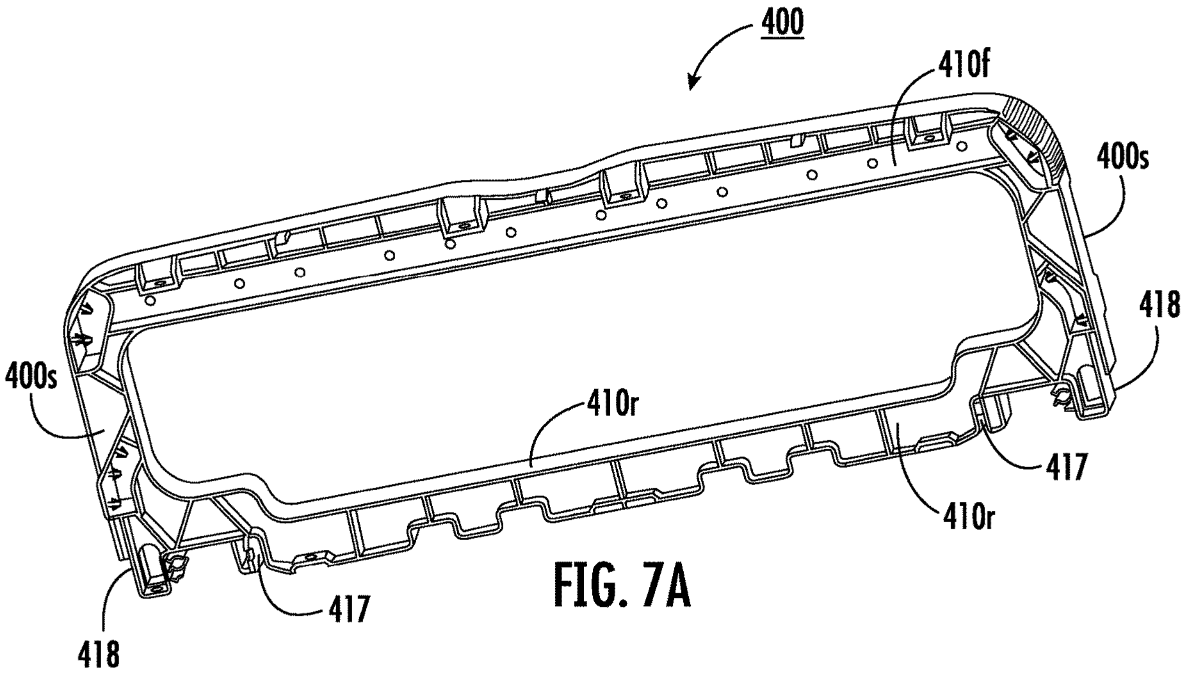
FIG. 7A is an enlarged side perspective view of a laterally extending strut shown in FIG. 4 according to embodiments of the present invention.
Figure 7B:
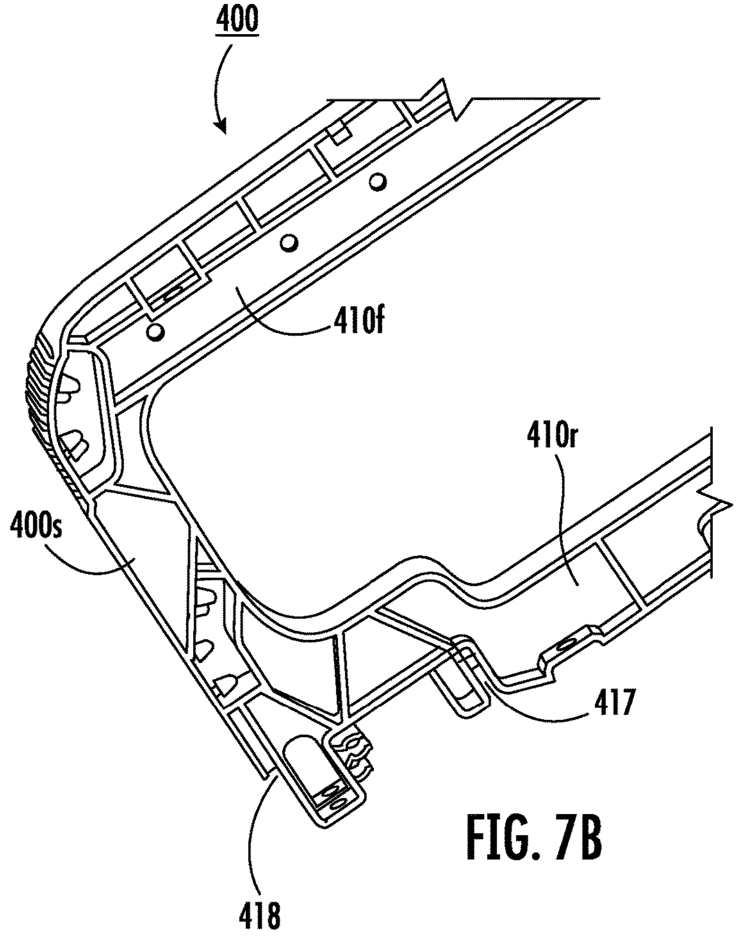
FIG. 7B is an enlarged view of a corner segment of the strut shown in FIG. 7A.
Figure 8:
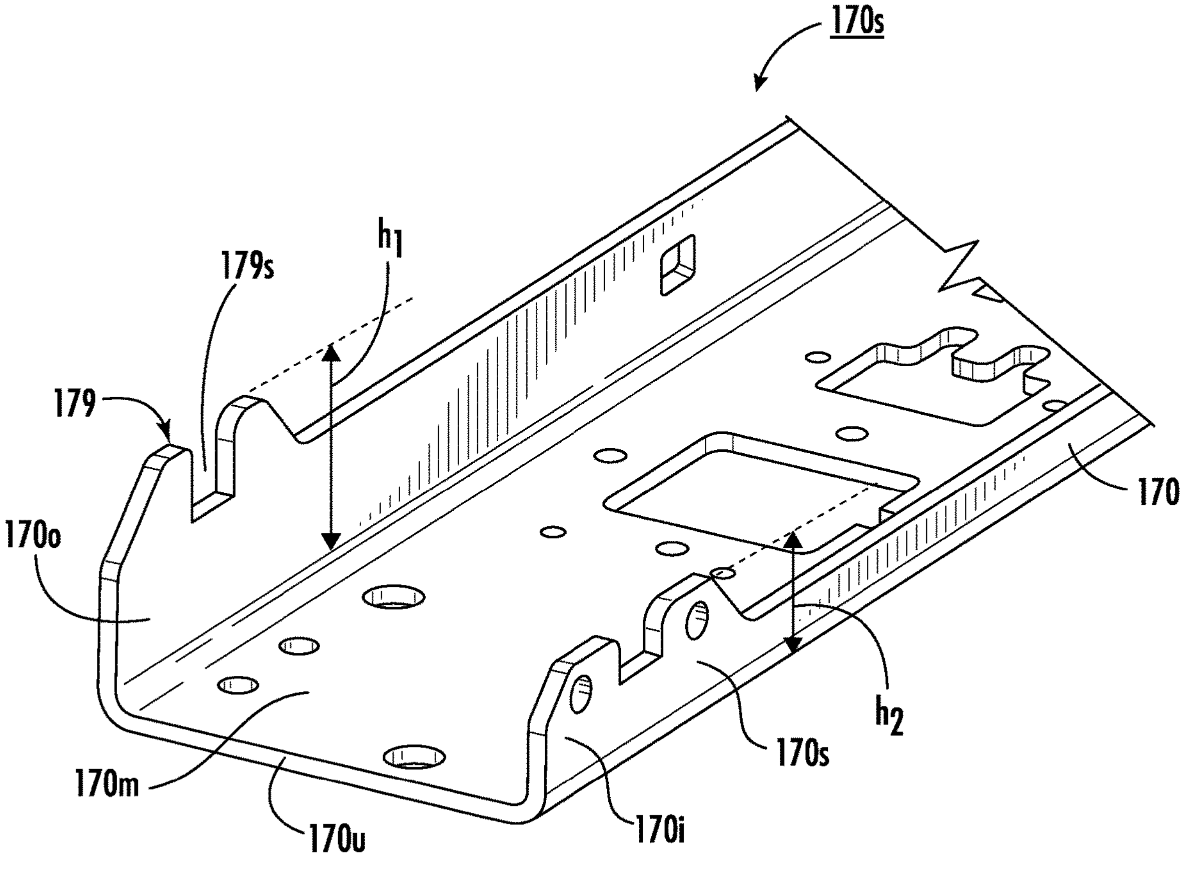
FIG. 8 is an enlarged view of a segment of a reflector shown in FIG. 4.

The rear 100*r* of the housing 100*h* may be provided as a closed outer surface (FIGS. 1, 6A). In other embodiments, the rear 100*r* can have an open space or window 272 (FIGS. 3, 6B) extending a sub-length of the rear 100*r* of the housing 100*h*. A majority of the open space 172 of the reflector and the open space 272 of the rear wall 100*r* can align.

The reflector 170 can have a first (shown as upper) portion 170*a* with the spaced apart strip segments 170*s* and can merge into a primary reflector portion 214 that extends longitudinally and laterally. The primary reflector portion 214 may have a longitudinal length that is greater than a longitudinal length of the strip segments 170*s*. The primary reflector 214 can have a solid reflection surface for antenna elements residing in front of the primary reflector 214 and may reside over operational components 314, such as filters, tilt adjusters and the like. The primary reflector portion 214 can extend forwardly of and be parallel to the first reflector portion 170*a*. The primary reflector portion 214 can reside in a different plane than the first reflector portion 170*a*, shown in FIGS. 3 and 4 with the primary reflector 214 in a plane in front of a plane of the first reflector portion 170*a*. The primary reflector 214 can alternatively be co-planar with the first reflector portion 170*a*. The first reflector portion 170*a* and the primary reflector 214 may comprise a single monolithic structure in some embodiments.

Figure 3:
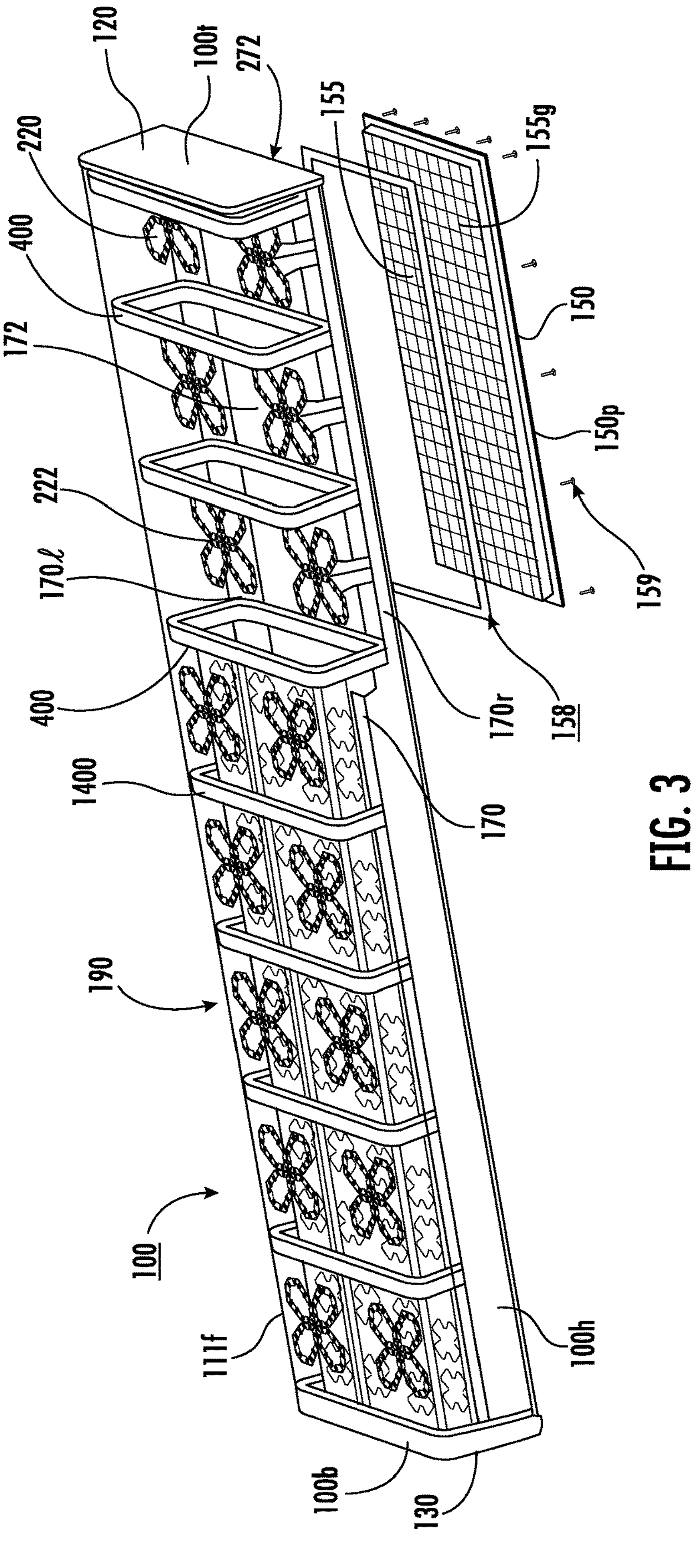
FIG. 3 is a partially transparent, front, side perspective, partially exploded view of an example base station antenna according to embodiments of the present invention.

Referring to FIGS. 2 and 3, the base station antenna housing 100*h* can comprise a plurality of laterally extending struts 400 that are longitudinally spaced apart and that can extend inside the base station antenna housing 100*h*.

Figure 4:
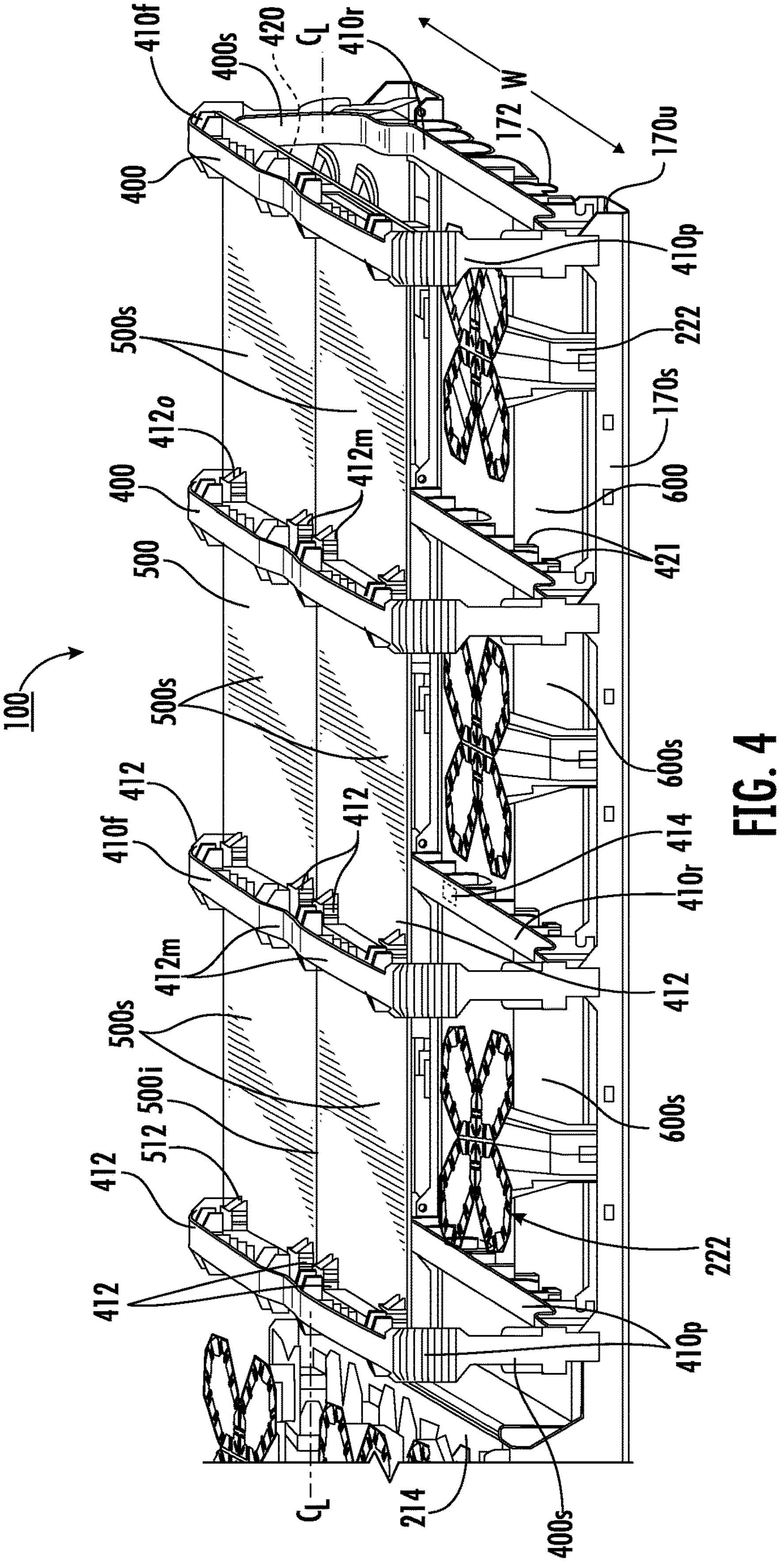
FIG. 4 is a front, side perspective, view of an internal portion of the base station antenna shown in FIG. 1 illustrating an example strut system according to embodiments of the present invention.

Referring to FIGS. 4, and 6A at least some of the struts 400 can have laterally extending pairs 410*p* of arms 410 that can be provided as forward and rearward arms, 410*f*, 410*r*, respectively, positioned in a front-to-back direction of the base station antenna housing 100*h* and that span an open space 411 therebetween.

The struts 400 can support at least one matching layer, shown as a first matching layer 500 and a second matching layer 600. The first matching layer 500 is shown as supported by the forward arm 410*f* and the second matching layer 600 is shown as supported by the rearward arm 410*r*.

The at least one matching layer 500, 600 can be configured to adjust the radiation pattern generated by radiating elements positioned behind the at least one matching layer. The matching layer(s) can be configured to reduce reflections that may otherwise occur because certain radiating elements are relatively far way (behind) the front radome placing the front radome in the far-field. Dielectric materials that form the front radome and/or rear radome of the passive antenna device 190/100*h* typically have frequency selectivity to electromagnetic waves. The higher the frequency of the electromagnetic waves, the greater the effect of the dielectric materials thereon, such as poorer transmittance and higher reflectivity. Poorer transmittance may cause the signal strength of the electromagnetic waves to be reduced, thereby causing the gain of the base station antenna to be reduced. The higher the reflectivity, the more the electromagnetic waves are reflected by the radome 111*f*, 111*r* and these reflected waves superimpose with the electromagnetic waves radiated by the radiating elements, which cause jitters and ripples in the radiation pattern. These are undesirable effects.

In order to compensate the adverse effects of the radome of the passive antenna device 190, such as the front radome 111*f*, on the electromagnetic waves from the active antenna unit 110, a matching (dielectric) layer 500 and/or 600 may be provided in the passive antenna device 190, where the matching layer 500 and/or 600 may be arranged between the radiating element array 220 of the passive antenna device 190 and the front radome 111*f*. The matching layer 500 and/or 600 may have a certain thickness and dielectric constant, and the dielectric constant of the matching layer 500 and/or 600 is larger than the dielectric constant of air. Design personnel may adjust the reflection of the electromagnetic waves from the active antenna unit 110 by designing the thickness and dielectric constant of the matching layer 500 and/or 600 such that these reflected waves superimpose out of phase and even anti-phase to reduce the reflectivity of the entire radome, thereby allowing the reflectivity and transmittance of the entire radome to meet design goals.

The distance between the matching layer 500 and/or 600 and the front radome 111*f* of the passive antenna device 100*h* may be any suitable distance.

The distance between the rear radome 111*r*/100*r* of the passive antenna device 100*h* and the matching layer 500 and/or 600 is up to a first distance D1, and the distance between the active antenna unit 110, such as the front radome 119 thereof, and the rear radome 111*r*/100*r*/150 of the passive antenna device 100*h* is up to a second distance D2. The first distance may be selected as 0.25+n/2 times that of the equivalent wavelength, where n is a positive integer (such as 1, 2, 3, 4, . . . ) and the second distance may be selected as 0.25+N/2 times of the equivalent wavelength, where N is a natural number (such as 0, 1, 2, . . . ). The equivalent wavelength is associated with a wavelength corresponding to the center frequency of the operating frequency band of the radiating elements in the active antenna unit 110, such as the theoretical wavelength in an air medium or in vacuum. In other words, the selection of the first distance D1 and the second distance D2 in the passive antenna device 100*h* is related to the operating frequency band of the radiating elements 1195 in the active antenna unit 110. By selecting an appropriate distance, the reflection of the electromagnetic waves from the active antenna unit 110 by the passive antenna device 100*h* may be effectively reduced.

The distance between the matching layer 500 and/or 600 and the front radome 111*f* of the passive antenna device 100*h* may be up to a third distance D3, which may be selected as 0.25+M/2 times the equivalent wavelength, where M is a natural number (such as 0, 1, 2, . . . ).

In some embodiments, the equivalent wavelength may be within the range of 0.8 to 1.2 times the wavelength corresponding to the center frequency. In some embodiments, the equivalent wavelength may be within the range of 0.9 to 1.1 times the wavelength corresponding to the center frequency. In some embodiments, the equivalent wavelength may be equivalent to the wavelength corresponding to the center frequency.

As an example, where the operating frequency band of the radiating elements in the active antenna unit 110 is 2.2-4.2 GHz, the center frequency may be selected as 3.2 GHz. The wavelength corresponding to the center frequency may be approximately 90 mm. When the equivalent wavelength is equivalent to the wavelength corresponding to the center frequency, the first distance D1 may be 67.5 mm (n=1), 112.5 mm (n=2), 157.5 mm (n=3) . . . 67.5+(n−1)*45 mm, and the specific size may be determined based on actual needs. At the same time, the second distance D2 may be selected as 22.5+N*45 mm, and the third distance D3 may be selected as 22.5+M*45 mm. Typically, in order to reduce the size of the base station antenna, N and M may be selected as 0.

Again, it should be understood that the aforementioned matching layer 500 and/or 600 is not required.

It should be understood that when the distance between two dielectric layers is selected as 0.25+n/2 times the equivalent wavelength, the aforementioned effects may similarly be applicable. For this, design personnel may consider the requirements on the size of the base station antenna while adjusting the distance between two adjacent dielectric layers such that these reflected waves superimpose out of phase and even anti-phase to reduce the reflectivity in the entire transmission process, thereby allowing the reflectivity and transmittance of high-frequency electromagnetic waves to meet the design goals.

Referring to FIGS. 4 and 6A, the forward arm 410*f* of a plurality of longitudinally spaced apart struts 400 can support the first matching layer 500. The first matching layer 500 can reside in front of the reflector segments 170*s*, extending across the window 172. The second matching layer 600 resides behind the first matching layer 500.

As shown in FIG. 6A, the first matching layer 500 and the second matching layer 600 reside in the base station antenna housing 100*h* behind the front radome 111*f* of the base station antenna housing 100*h*.

The first matching layer 500 and/or the second matching layer 600 can be provided as a plurality of separate matching layer segments 500*s*, 600*s*, respectively.

For example, in some embodiments, the first matching layer segments 500*s* can be arranged as three vertically stacked first matching layer segments 500*s* and two rows of side-by-side first matching layer segments 500*s* provided in a width direction W, for a total of six matching layer segments 500*s*. However, other configurations of the first matching layer 500 can be used. For example, a single piece first matching layer 500 may be used without requiring separate first matching layer segments 500*s*. In other examples, the first matching layer segments 500*s* can be provided as two strips that extend longitudinally and that are positioned side-by-side in a width direction W. Neighboring first matching layer segments 500*s* (side-to-side neighbors and/or top-to-bottom vertically stacked neighbors) can have outer perimeters 500*p* with inner facing perimeter portions 500*i* that are adjacently positioned, typically within a range of about 0.0 and 3 mm of each other.

Similarly, in some embodiments, the second matching layer 600 can be arranged in second matching layer segments 600*s*. For example, the second matching layer 600 can be arranged as three vertically stacked second matching layer segments 600*s* and two rows of side-by-side second matching segments 600*s* provided in a width direction W, for a total of six matching layer segments 600*s*. However, other configurations of the second matching layer 600 can be used. For example, a single piece second matching layer 600 may be used without requiring separate second matching layer segments 600*s*. In other examples, the second matching layer segments 600*s* can be provided as two strips that extend longitudinally and that are positioned side-by-side in a width direction W. Neighboring second matching layer segments 600*s* (side-to-side neighbors and/or top-to-bottom vertically stacked neighbors) can have outer perimeters 600*p* with inner facing perimeter portions 600*i* that are adjacently positioned, typically within a range of about 0.0 and 3 mm of each other.

The first matching layer 500 can be provided in a different configuration than the second matching layer 600. For example, the first matching layer 500 can be provided as a plurality of first matching layer segments 500*s* while the second matching layer 600 can be a unitary, monolithic sheet of material. The first matching layer 500 may be used alone without a second matching layer 600. The second matching layer 600 can be used alone without the first matching layer 500. Additional matching layers may be provided in front of or behind one or both of the first or second matching layers 500, 600 (not shown).

Figure 5A:
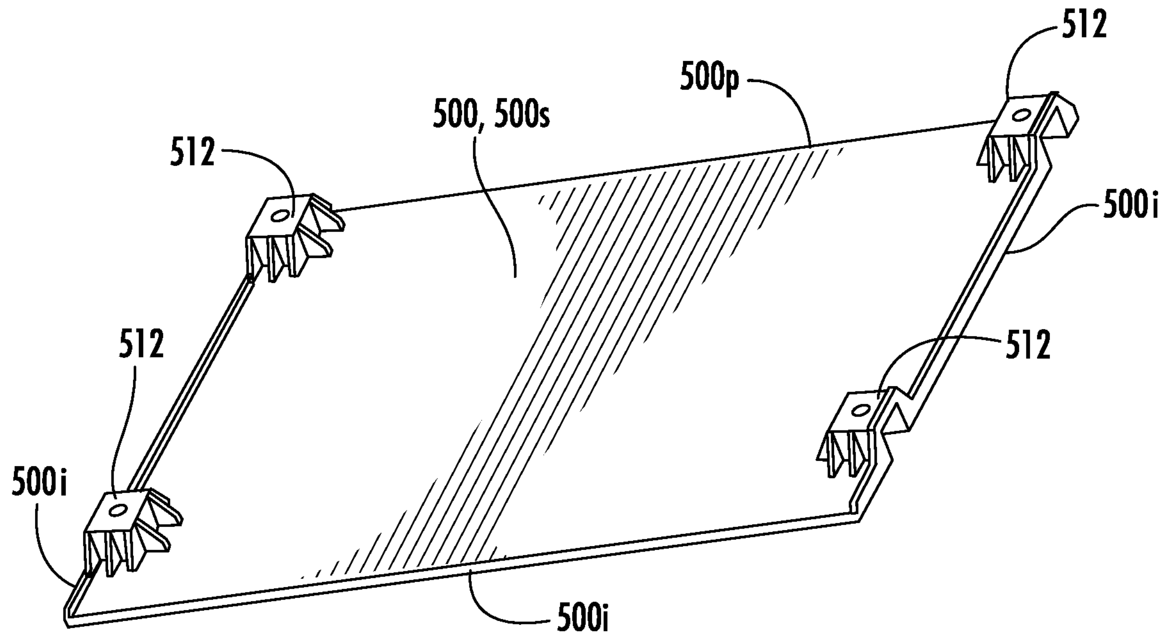
FIG. 5A is a front, side perspective view of a first matching layer shown in FIG. 4 according to embodiments of the present invention.
Figure 5B:
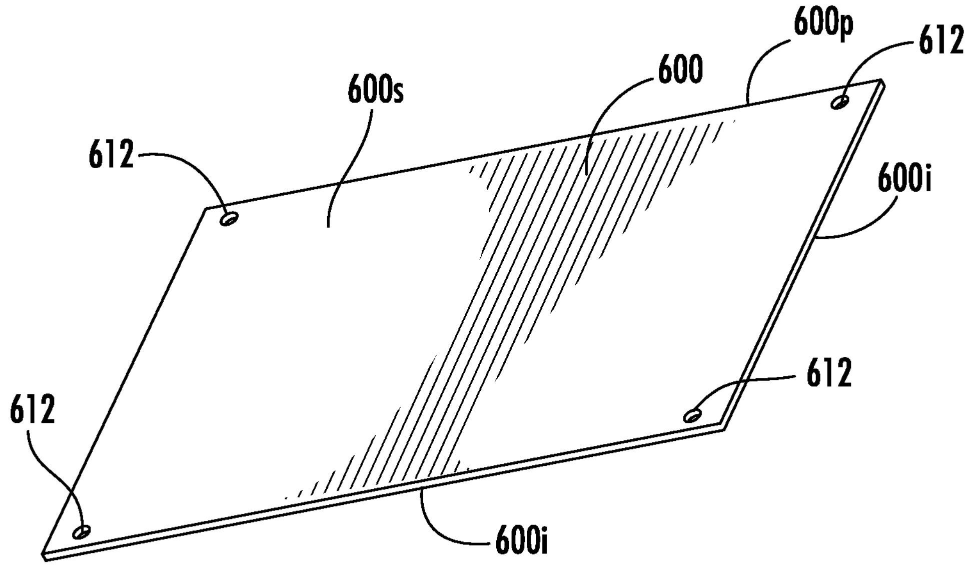
FIG. 5B is a front, side perspective view of a second matching layer shown in FIG. 4 according to embodiments of the present invention.

Referring again to FIGS. 4, 5A and 6A, the forward arm 410*f* can comprise a plurality of laterally spaced apart coupling segments 412 that can couple to corresponding fastener segments 512 of the first matching layer 500. A fastener 420, such as a pin or rivet, for example, can be used to attach aligned sets of coupling and fastener segments 412, 512. Two medially residing coupling segments 412*m* can reside closer together than outer coupling segments 412*o*. The two medially residing coupling segments 412*m* can be arranged so that one resides on different sides of a longitudinally extending centerline C/L.

The second matching layer 600 can comprise fastening apertures 612 that align with coupling apertures 414 in the rearward arm 410*r*. A fastener 421, such as a pin or rivet, for example, can be inserted through aligned coupling apertures 414 and fastening apertures 612 to attach the second matching layer 600 to the rearward arm 410*r*. The second matching layer 600 can be held below or above the rearward arm 410*r*.

Referring to FIGS. 4, 6A, 6B, 7A, 7B, the struts 400 can have side walls 400*s* that join the forward arm 410*f* and the rearward arm 410*r*. The side walls 400*s* extend in a front-to-back direction of the base station antenna housing 100*h*. The struts 400 can be a molded, dielectric material. The struts 400 can have a lightweight polymer or copolymer body. The struts 400 can each be provided as a monolithic unitary body for increased structural rigidity.

FIG. 3 shows that the rear 100*r* of the housing 100*h* can have an opening 272 that extends laterally and longitudinally, aligned with the window/opening 172 in the reflector 170.

FIG. 6A illustrates that the rear 100*r* of the base station antenna housing 100*h* can be a closed wall/surface.

Referring to FIGS. 4, 6A, 6B, and 8, the reflector 170 can be attached to the rearward arm 410*r* of a plurality of the struts 400. The reflector segments 170*s* can each have a "U" shaped rear portion 170*u* that attaches to a plurality of the struts 400. The rear portion 170*u* can have an outer side 170*o* that has a first height $h_1$ (in a front to back direction) and an inner side 170*i* that has a second height $h_2$ (in the front to back direction) with a medial (typically flat) segment 170*m* therebetween that defines the "U-shape". As shown, $h_1>h_2$. The inner side 170*i* can project forwardly and frictionally engage a rearwardly extending lip 417 provided in the rearward arm 410*r*. The outer side 170*o* can engage a laterally spaced apart portion of the strut 400, typically a rearward portion of the side wall 400*s* or the rearward arm 410*r*.

Each reflector strip 170*s* can be configured as a respective unitary sheet of metal with bends that provide the U-shaped rear portion 170*u*. Fasteners, such as pins or rivets, can be used to further attach the struts 400 to the reflector 170 via apertures. The outer side 170*o* can have a forwardly projecting coupling segment 179 with a slot 179*s* that receives a coupling feature 418 in the side wall 400*s* or rearward arm 410*r* of the strut 400.

The struts 400 can be provided as a first subset of struts of the base station antenna housing 100*h*. A second subset of struts 1400 (FIGS. 3, 9) can laterally extend and have a different configuration from the first subset of struts. The second subset of struts 1400 do not couple to matching layers and extend across the primary reflector 214, typically below the right and left side reflector strips 170*s* of the first reflector portion 170*a*.

Figure 9:
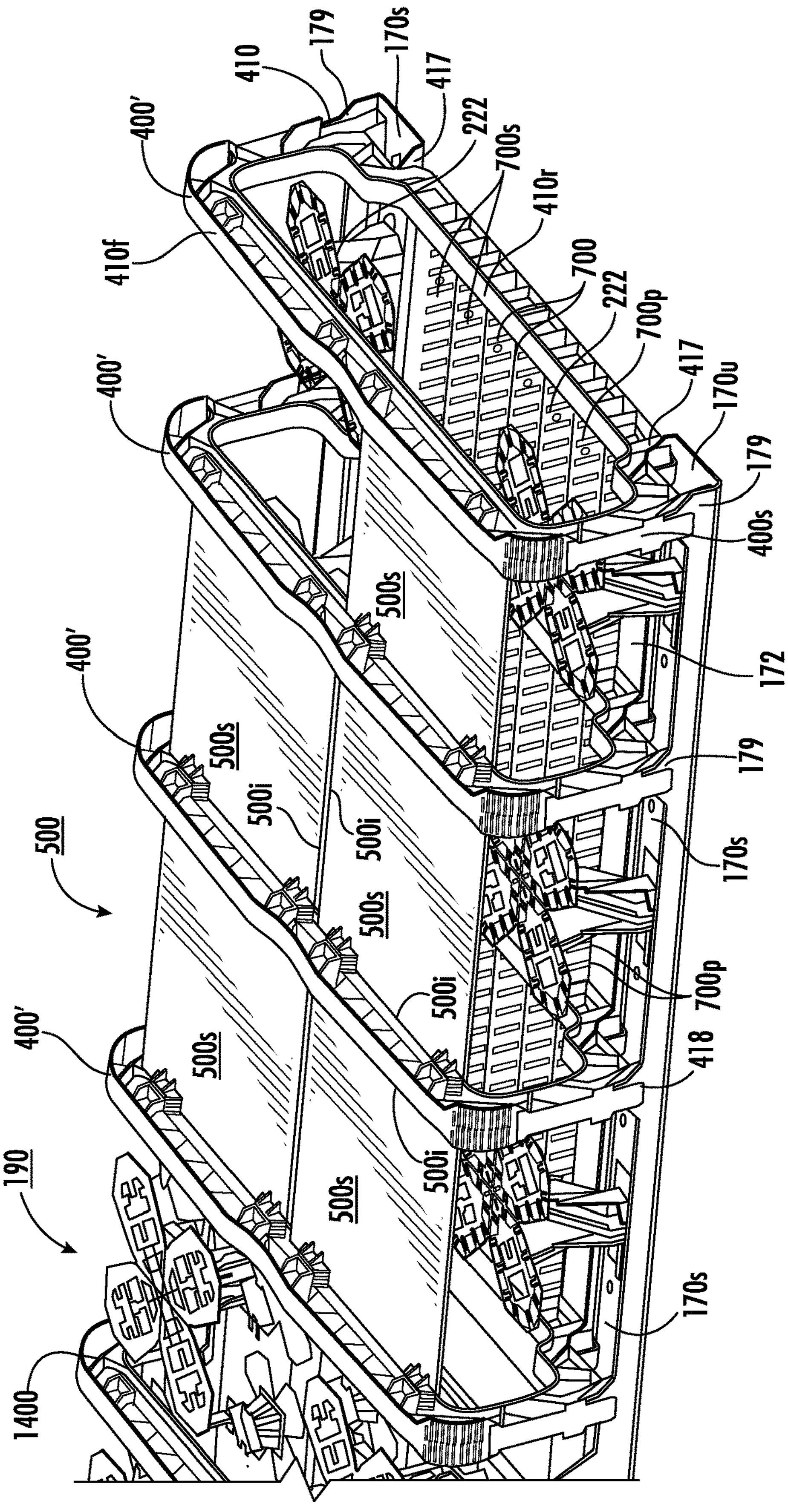
FIG. 9 is front, side view of a portion of a base station antenna illustrating another embodiment of a strut system according to embodiments of the present invention.

Turning now to FIG. 9, the base station antenna 100 can also comprise a plurality of conductive members 700 that can be configured to provide tuning for RF performance to improve the cross-polarization isolation of the beamforming array of the active antenna module.

The cross-polarization performance of the active antenna unit 110 may be negatively influenced by the array layout of the active antenna unit 110 with respect to the passive antenna assembly 190, passive antenna/base station antenna housing 100*h* positioned in front of the active antenna 110. In order to reduce this negative influence, the conductive members 700 can be configured as metal tuning elements for the active antenna unit 110 that may maintain good cross-polarization performance for the active antenna unit 110 over a wide scanning angle range.

Cross-polarization performance of the base station antenna such as, for example, cross-polarization isolation may be desirable for improved performance. "Cross-polarization" isolation refers to how well radiating elements of the base station antenna 100 having a first polarization will be isolated from radio frequency ("RF") energy radiated by radiating elements of the base station antenna that have a second (orthogonal) polarization.

In addition, the cross-polarization performance of the active antenna unit 110 may differ as a function of the scanning angle of the antenna beam generated by the active antenna unit 110. For example, in some cases, at small horizontal (i.e., azimuth plane) scanning angles, e.g., around 0°, the active antenna unit tends to have good cross-polarization performance (e.g., good cross-polarization discrimination); however at large horizontal scanning angles, e.g., around 47°, the active antenna unit 110 may exhibit relatively poor cross-polarization performance. Thus, the conductive members 700 can be configured as tuning elements to improve the cross-polarization discrimination at large scan angles.

The conductive members 700 may be electrically floating, meaning that the conductive members 700 are not in direct electrical contact with other conductive structures, such as reflective plates. The conductive members 700 can be configured to improve the cross-polarization performance of the active antenna unit 110 at a small horizontal scanning angle and/or a large horizontal scanning angle, such as peak cross-polarization discrimination rate.

In some embodiments, the conductive members 700 may be configured to: improve the peak cross-polarization discrimination rate of the antenna beams generated by the active antenna unit 110 at a horizontal scanning angle larger than a first angle and/or to improve the peak cross-polarization discrimination rate of the antenna beams generated by the active antenna unit 110 at a horizontal scanning angle smaller than a second angle.

In some embodiments, the conductive members 700 may be configured to: improve the peak cross-polarization discrimination rate by at least 2 dB at a horizontal scanning angle greater than the first angle (e.g., 41°~53°), and/or to improve the peak cross-polarization discrimination rate by at least 2 dB at a horizontal scanning angle smaller than the second angle (e.g., 0°~12°), relative to the base station antenna 100 having the same configuration but without such conductive members 700.

Each conductive member 700 can be constructed as an elongate metal tuning element. The longitudinal axis of each conductive member 700 may extend at an angle of 70°~110°, 80°~100° or basically 90° with respect to a plane defined by the primary surface of the reflector 170, 214. In the present disclosure, the extension size of the conductive member 700 corresponding to its longitudinal axis is different from its lateral extension size. Different extension ratios may be set according to the actual needs of the active antenna unit 110. Through simulation and experimental verification, it is found that stronger resonance compensation may be required in the longitudinal direction in the current embodiment. That is to say, the extension size of the tuning element provided by the conductive member 700 on its longitudinal axis may be larger than its lateral extension size, for example, 2 times, 3 times or even 5 times larger than its lateral extension size. Based on the (e.g., smaller) lateral extension size of the tuning element provided by the conductive member 700, the tuning element can provide a (e.g., smaller) projection component along the longitudinal direction at a small horizontal scanning angle, and based on the (e.g., larger) longitudinal extension size of the tuning element, the tuning element can provide a (e.g., larger) projection component along the longitudinal direction at a large horizontal scanning angle. Based on these projection components, the conductive members 700 (metal tuning elements) according to the present disclosure can provide different amounts of tuning for small horizontal scanning angles and large horizontal scanning angles, that is, improve the cross-polarization performance of the active antenna unit 110 not only at small horizontal scanning angles but also at large horizontal scanning angles, so as to maintain good cross-polarization performance over a wide scanning angle range.

It should be understood that the shapes of the conductive members 700 can vary and are not required to be rectangular. For example, the conductive members 700 can be trapezoidal, triangular, elliptical, L-shaped, T-shaped and T-shaped etc. . . .

The extension size of the tuning element on the longitudinal axis (that is, the extension size in the forward direction of the base station antenna) can be larger than its lateral extension size (that is, the extension size in the longitudinal direction of the base station antenna), so that the tuning element can provide a smaller projection component along the longitudinal direction at a smaller horizontal scanning angle and a larger projection component along the horizontal direction at a larger horizontal scanning angle.

In some embodiments, the extension size on the longitudinal axis of the conductive members 700 can be a range of 0.1~0.5, 0.15~0.4 or about 0.25 wavelength length, which is the wavelength corresponding to the center frequency wavelength of the operating band of the radiating elements 1195 in the active antenna unit 110.

As shown in FIG. 9, the plurality of conductive members 700 can be perpendicular to the rear wall 100*r* of the base station antenna housing 100*h* and reside inside the base station antenna housing 100*h* in front of the active antenna unit 110.

Figure 10A:
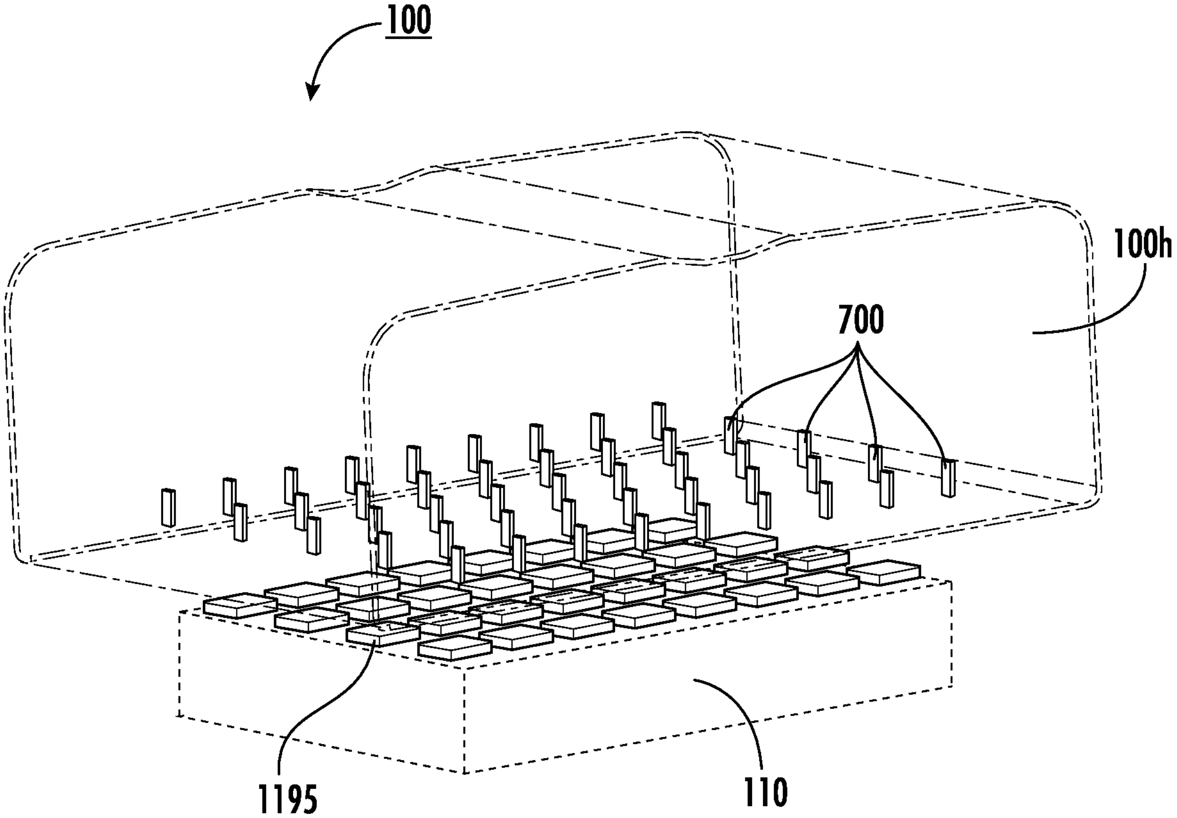
FIG. 10A is a simplified schematic illustration of a base station antenna with an active antenna unit according to embodiments of the present invention.
Figure 10B:
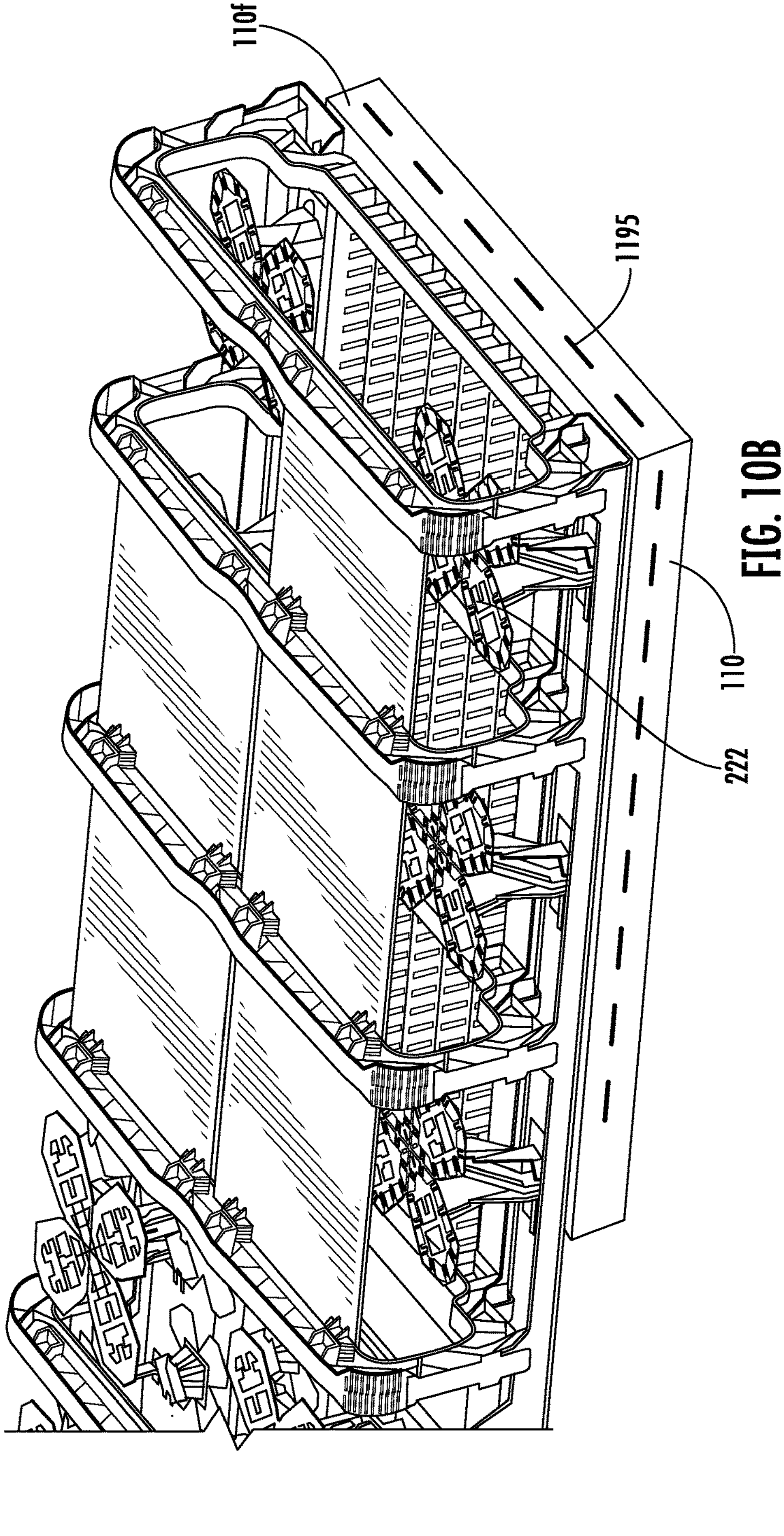
FIG. 10B shows the base station antenna of FIG. 9 with an active antenna unit.

As shown in FIG. 9, the plurality of conductive members 700 can be provided as a plurality of laterally spaced apart and longitudinally extending substrates 700*s*. The substrates 700*s* can be printed circuit boards 700*p*. The simplified schematic illustration of FIG. 10A shows the plurality of conductive members 700 without the printed circuit boards 700*p* and in front of the mMIMO array of radiating elements 1195 of the active antenna unit 110. FIG. 10B shows the printed circuit boards 700*p* with the conductive members 700 positioned adjacent the front 110*f* of the active antenna unit 110 with the array of radiating elements 1195, typically configured as an array of mMIMO radiating elements.

The plurality of conductive members 700 can be conductive planar pins formed as conductive patches on or in the printed circuit boards 700*p*. The conductive members 700 can be configured to operate as "parasitic elements" and/or "tuning elements" to improve cross-polarization performance of the active antenna unit 110. The printed circuit boards 700*p* can be arranged in columns with equally spaced apart, or unequally spaced apart, conductive members 700 that reside behind the first matching layer 500 and/or the forward arm 410*f* of the strut 400, 400'. The printed circuit boards 700*p* can extend longitudinally, parallel to each other, and can be attached to the rearward arm 410*r* of the struts 400'.

Referring to FIGS. 9, 11A, 11B and 12, the rearward arm 410*r* of the struts 400', 400", 400" can have laterally spaced apart channels 410*c* and at least some of the channels 410*c* can comprise attachment features 1410 that extend through aligned apertures 701 in the printed circuit boards 700*p*.

Figure 11A:
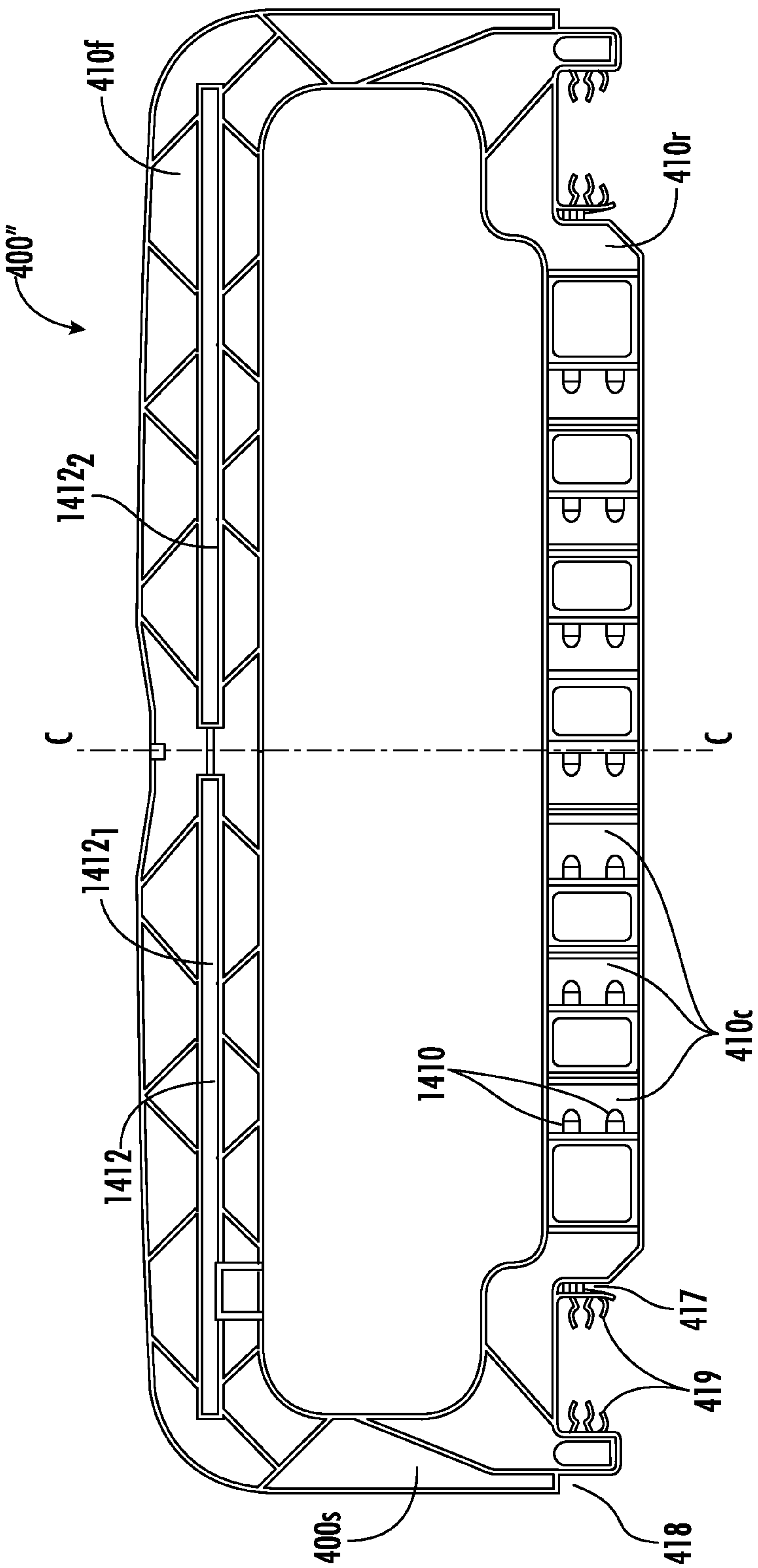
FIG. 11A is an enlarged view of a strut shown in FIG. 9 according to embodiments of the present invention.
Figure 11B:
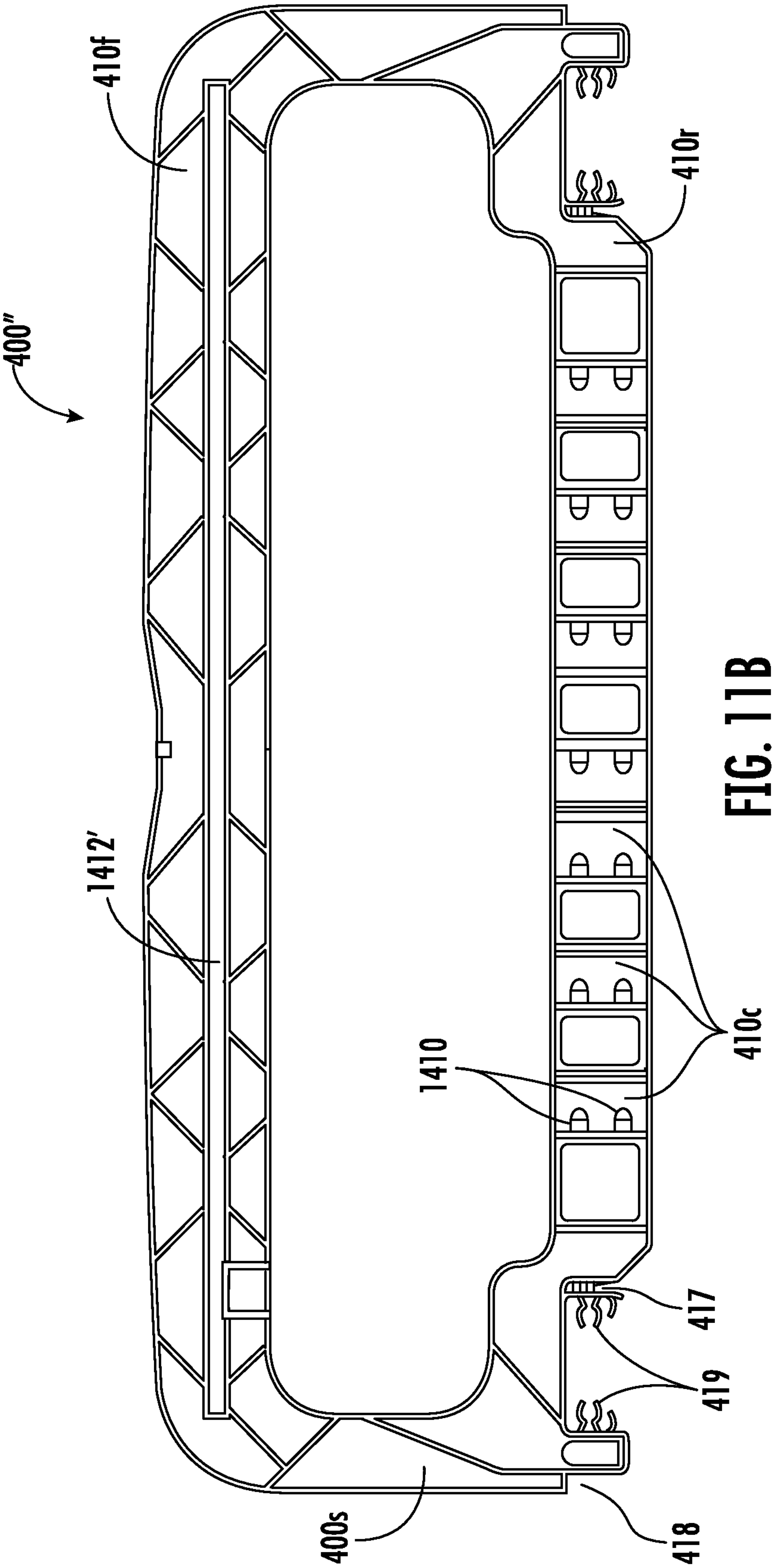
FIG. 11B is an enlarged view of another embodiment of a strut according to embodiments of the present invention.

Referring to FIGS. 11A and 11B, the struts 400", can be configured with at least one laterally extending slot 1412. The slot 1412 can be provided on the forward arm 410*f* and can slidably receive the first matching layer 500 to mount the matching layer 500.

Figure 11C:
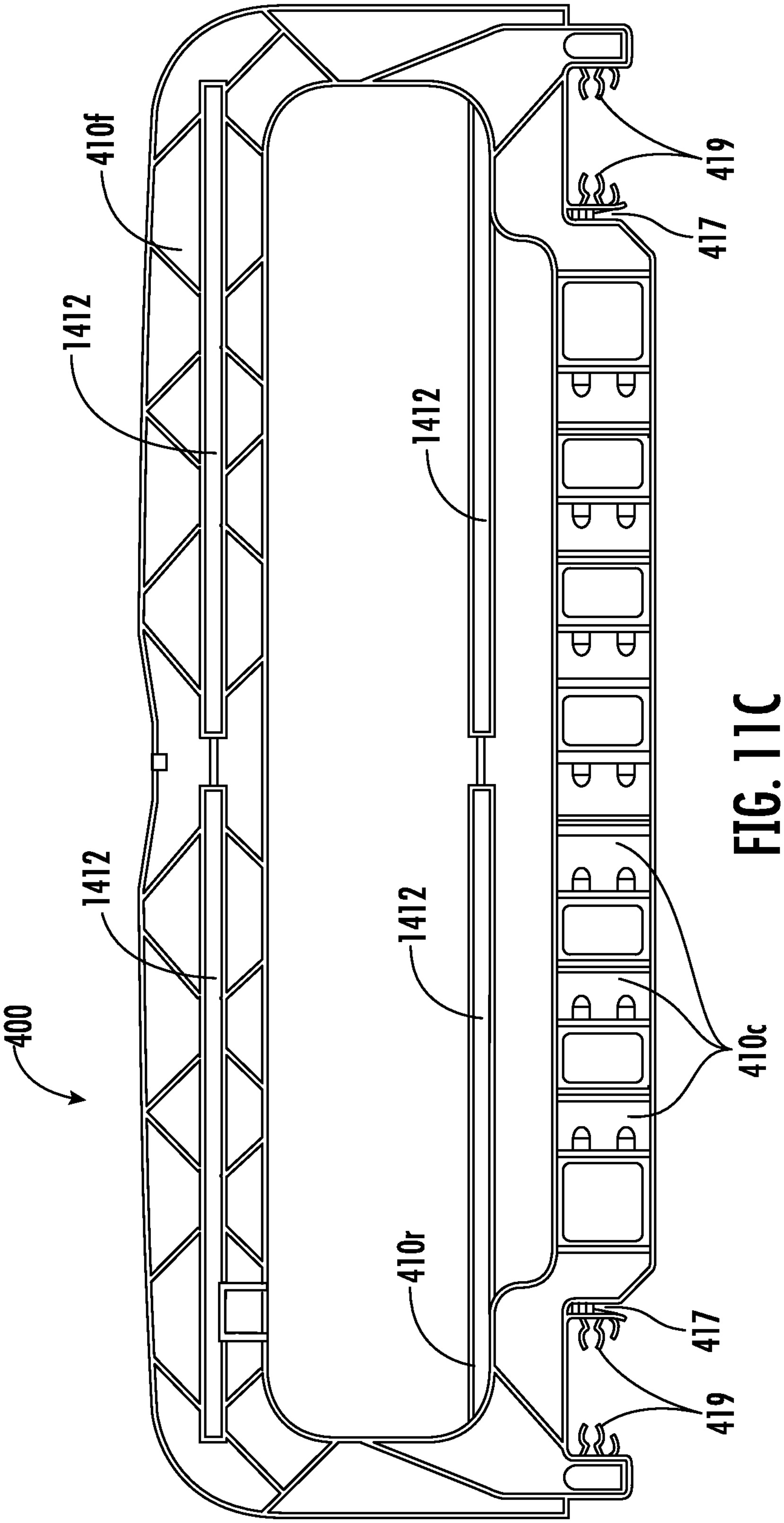
FIG. 11C is an enlarged view of another embodiment of a strut according to embodiments of the present invention.
Figure 12:
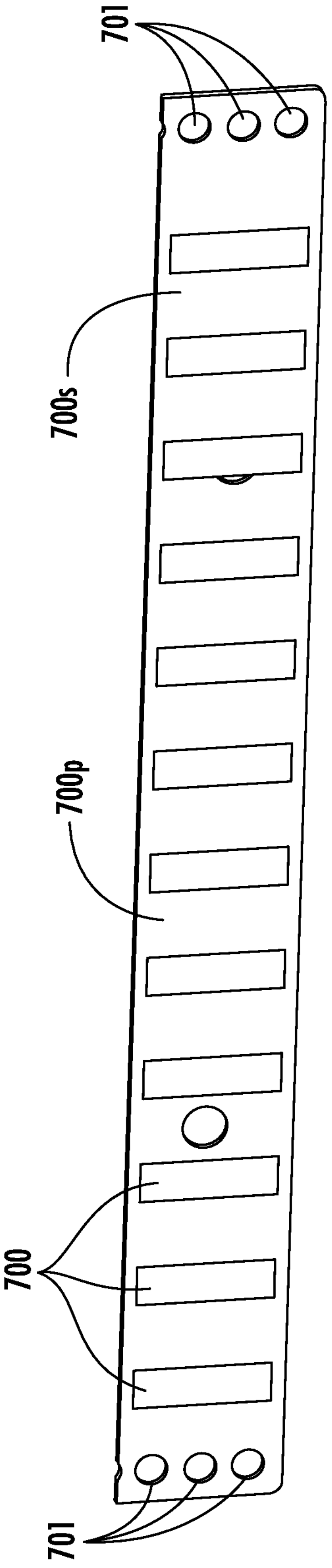
FIG. 12 is an enlarged view of an example printed circuit board shown in FIG. 4 according to embodiments of the present invention.

The fastening segments 412 shown in FIG. 4 are not required. While FIG. 11A, 11B show the slot 1412 only on the forward arm 410*f*, the slot 1412 may alternatively or additionally be provided in the rearward arm 410*r* as shown in FIG. 11C, to mount the second matching layer 600.

FIG. 11A illustrates that there can be two adjacent slots 14121, 14122, one on each side of a center line C-C of the strut 400. FIG. 11B illustrates a single slot 1412 that extends across a medial portion of the strut to the side walls 400*s*.

FIGS. 11A and 11B also illustrate that the rearward arm 410*r* of the strut 400 can have laterally extending projections 419 configured as a cable clip to fix a phase cable or other cable.

Referring to FIG. 3, to facilitate the electromagnetic wave transmission from the active antenna unit 110 and/or minimize loss, a portion or segment of the rear 100*r* of the housing 100*h* can be coupled to a (rear) panel 150 that has a different material and/or a thinner thickness than the front radome 111*r*. The rear panel 150 can be formed of a material or substrate that has a lower dielectric constant than the front radome 111*f*.

The rear panel 150 can be detachably coupled to the rear 100*r* of the base station antenna housing 100*h*. Because the rear panel 150 is not required to provide structural support for the base station antenna housing 100*h*, it can have a thinner material thickness than a rear wall of the rear 100*r* of the housing 100*u* thereunder and/or thereabove.

The rear panel 150 can extend over an open space or window 272 in the rear 100*r* of the base station antenna housing 100*h*. The rear panel 150 can sealably attach to the rear 100*r* of the base station antenna housing 100*h*, covering the open space or window 272. The rear panel 150 can be rectangular in shape, as shown. However, other shapes are contemplated.

The rear panel 150 can cooperate with a seal 158 such as a gasket, O-ring, grommet or other seal member and/or configuration to provide a waterproof interface with the rear 100*r* of the housing 100*h*. Fasteners 159, such as waterproof rivets, positioned about an outer perimeter 150*p* of the rear panel 150 can be used to attach the rear panel 150 to the housing 100*h*. The seal member 158 can reside inside the housing 100*h* and/or outside the housing 100*h* and cooperate with the rear panel 150 and rear 100*r* of the housing 100*h* to provide a watertight seal. The seal member 158 can be provided as both an internal seal member and an external seal member for additional seal integrity (not shown).

The front radome 111*f* can be provided as a fiberglass material. The rear panel 150 can comprise a substrate formed of a different material than the front radome 111*f*, such as, for example, a polycarbonate ("PC") and/or sheet molding compound (SMC) configured to allow electromagnetic waves of the active antenna array 1195 to propagate therethrough with lower loss compared to a substrate formed of fiberglass in a thickness corresponding to that of the front radome 111*f*.

Still referring to FIG. 3, the base station antenna 100 can comprise at least one frequency selective surface ("FSS") 155. The FSS 155 can have a grid pattern 155*g*. The FSS 155 can reside inside the base station antenna housing 100*h*. The FSS 155 can reside across the open space 172 between the reflector strips 170*s*.

The FSS 155 can be provided in various manners. In some embodiments, the FSS 155 may be mounted on a suitable substrate such as, for example, a printed circuit board, PC and/or SMC. In some embodiments, the FSS can be arranged as a grid pattern 155*g* of metallic patches in one or more layers over and/or behind one or more dielectric layers, which may be provided by a multiple layer printed circuit board. The FSS 155 can alternatively be provided by a grid pattern 155*g* arranged in sheet metal as will be discussed further below.

Referring to FIG. 10B, the front 110*f* of the active antenna module 110 can abut a primary surface of the rear 100*r* of the base station antenna 100*h* and/or the rear panel 150 of the base station antenna housing 100*h* or be closely spaced apart therefrom, typically within 1-50 mm, more typically in a range of about 5 mm-25 mm.

The FSS 155 can be configured to allow high band radiating elements (typically located in the active antenna module 110) to propagate electromagnetic waves therethrough and to reflect lower band RF signals (lower band electromagnetic waves) from lower band radiating elements projecting forward of the FSS 155.

The reflector 170 of the base station antenna housing 100*h* can have an FSS 155 in that can reside in front of the FSS 155 of the rear panel 150 across the open space 172. See, e.g., U.S. patent application Ser. No. 17/468,783 and U.S. Provisional Patent Application Ser. No. 63/236,727, for examples of FSS and reflector configurations, the contents of which are hereby incorporated by reference as if recited in full herein.

FIG. 3 illustrates that the rear panel 150 can have a rectangular shape, with a long side extending longitudinally. However, other shapes are contemplated.

As discussed above, the FSS 155 can be provided by any suitable material(s) such as, for example, a printed circuit board with a metal grid pattern of metal patches, a non-metallic substrate comprising a metallized surface in a grid pattern 155*g* or a sheet or sheets of metal provided with a grid pattern 155*g*.

The grid pattern 155*g* can be arranged in any suitable manner and may be symmetric or asymmetric across a width and/or length of the FSS 155. Unit cells of the grid pattern 155*g* may be the same across and along the FSS 155 or may have different shapes and/or sizes.

Where used, the FSS 155 can comprise, in some embodiments, metamaterial, a suitable RF material or even air (although air may require a more complex assembly). The term "metamaterial" refers to composite electromagnetic (EM) materials. Metamaterials may comprise sub-wavelength periodic microstructures.

The FSS 155 can be provided as one or more cooperating layers. In some embodiments, the FSS 155 can include a substrate that has a dielectric constant in a range of about 2-4, such as about 3.7 and a thickness of about 5 mil and metal patterns formed on the dielectric substrate. The thickness can vary but thinner materials can provide lower loss.

The FSS 155 can be configured to allow RF energy (electromagnetic waves) to pass through at one or more first defined frequency band and that is configured to reflect RF energy at a different second frequency band. Thus, the FSS 155 can reside behind at least some antenna elements of the passive antenna assembly 190 and can selectively reject some frequency bands and permit other frequency bands such as those of the antenna elements of the active antenna 1190 to pass therethrough by including the frequency selective surface and/or substrate to operate as a type of "spatial filter".

A discussion of some example FSSs can be found in Ben A. Munk, Frequency Selective Surfaces: Theory and Design, ISBN: 978-0-471-37047-5; DOI:10.1002/0471723770; April 2000, Copyright © 2000 John Wiley & Sons, Inc., the contents of which are hereby incorporated by reference as if recited in full herein. See also, co-pending U.S. patent application Ser. No. 17/468,783, the contents of which are also incorporated by reference as if recited in full herein.

The FSS 155 can be in front or behind and parallel to laterally extending segments of the right and left sides 170*r*, 170*l* of the reflector 170.

In some embodiments, the FSS 155 can be configured to act like a High Pass Filter essentially allowing mid band and/or low band energy<2.7 MHz, to substantially reflect (the FSS can act like a sheet of metal) while allowing higher band energy, for example, about 3.5 GHz or greater, to substantially pass through. Thus, the FSS 155 is transparent or invisible to the higher band energy and a suitable out of band rejection response from the FSS can be achieved. The FSS 155 may allow a reduction in filters or even eliminate filter requirements for looking back into the radio 1120.

In some embodiments, the FSS 155 may be implemented by forming the frequency selective surface on a printed circuit board, optionally a flex circuit board. In some embodiments, a multi-layer printed circuit board can comprise one or more layers which form the FSS 155 configured such that electromagnetic waves within a predetermined frequency range cannot propagate therethrough and one or more other predetermined frequency range associated with the one or more layers of the multi-layer printed circuit board is allowed to pass therethrough. The grid pattern 155*g* can comprise shaped metal patches of any suitable geometry.

In some embodiments, the FSS 155 is provided by a sheet or sheets of metal that is/are stamped, punched, acid etched, or otherwise formed to provide a grid pattern 155*g*. The grid pattern 155*g* can be configured to have closed or open unit cells 1305 of any suitable geometry.

The FSS 155 can be provided as a single layer of sheet metal providing the grid pattern 155*g* with the unit cells and with the open centers or interiors devoid of metal. For further discussion of metal grids, see co-pending U.S. Provisional Application Ser. No. 63/254,446, the contents of which are hereby incorporated by reference as if recited in full herein.

The passive antenna assembly 190 comprises multiple arrays of radiating elements, typically provided in columns, with radiating elements that extend forwardly from the primary reflector 214, with some columns of radiating elements continuing to extend in front of the front side of the reflector strips 170*r*, 170*l* and/or open space 172 and/or the rear panel 150. The arrays of radiating elements of the antenna assembly 190 may comprise radiating elements 222 that are configured to operate in a first frequency band and radiating elements 232 that are configured to operate in a second frequency band. Other arrays of radiating elements may comprise radiating elements that are configured to operate in either the second frequency band or in a third frequency band.

The first, second and third frequency bands may be different frequency bands (although potentially overlapping). In some embodiments, low band radiating elements 222 that are configured to operate in some or all of the 617-960 MHz frequency band) can reside in front of and along right and left side portions 170*r*, 170*l* of the reflector 170 and/or right and left sides of the primary reflector 214.

Some of the radiating elements of the antenna 100 may be mounted to extend forwardly from the primary reflector 214, and, if dipole-based radiating elements are used, the dipole radiators of these radiating elements may be mounted approximately of a wavelength of the operating frequency for each radiating element forwardly of the main reflector 214. The main reflector 214 may serve as a reflector and as a ground plane for the radiating elements of the base station antenna 100 that are mounted thereon.

The passive antenna assembly 190 of the base station antenna 100 can include one or more arrays 220 of low-band radiating elements 222, one or more arrays of first mid-band radiating elements, one or more arrays of second mid-band radiating elements and optionally one or more arrays of high-band radiating elements. The radiating elements may each be dual-polarized radiating elements. Further details of radiating elements can be found in co-pending WO2019/236203 and WO2020/072880, the contents of which are hereby incorporated by reference as if recited in full herein. Some of the high band radiating elements, such as radiating elements 1195, can be provided as a mMIMO antenna array and may be provided in the active antenna module 110.

Referring to FIGS. 2 and 3, the low-band radiating elements 222 can be mounted to extend forwardly from the main or primary reflector 214 and one or both of the reflector strips 170*r*, 170*l* and can be mounted in two columns to form two linear arrays 220 of low-band radiating elements 222. Each low-band linear array 220 may extend along substantially the full length of the antenna 100 in some embodiments.

The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The low-band linear arrays 220 may or may not be used to transmit and receive signals in the same portion of the first frequency band. For example, in one embodiment, the low-band radiating elements 222 in a first linear array 220 may be used to transmit and receive signals in the 700 MHz frequency band and the low-band radiating elements 222 in a second linear array 220 may be used to transmit and receive signals in the 800 MHz frequency band. In other embodiments, the low-band radiating elements 222 in both the first and second linear arrays may be used to transmit and receive signals in the 700 MHz (or 800 MHz) frequency band (e.g., to support 4×MIMO operation).

The linear arrays of first mid-band radiating elements may extend along the respective sides of the reflector 170*s* and/or the main reflector 214. The first mid-band radiating elements may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). In the depicted embodiment, the first mid-band radiating elements are configured to transmit and receive signals in the lower portion of the second frequency band (e.g., some or all of the 1427-2200 MHz frequency band). The linear arrays of first mid-band radiating elements may be configured to transmit and receive signals in the same portion of the second frequency band or in different portions of the second frequency band.

The second mid-band radiating elements can be mounted in columns to form linear arrays of second mid-band radiating elements. The second mid-band radiating elements may be configured to transmit and receive signals in the second frequency band. In the depicted embodiment, the second mid-band radiating elements are configured to transmit and receive signals in an upper portion of the second frequency band (e.g., some, or all, of the 2300-2700 MHz frequency band). In the depicted embodiment, the second mid-band radiating elements may have a different design than the first mid-band radiating elements 232.

The high-band radiating elements can be mounted in columns in the upper medial or center portion of antenna 100 to form a multi-column (e.g., four or eight column) array of high-band radiating elements. The high-band radiating elements may be configured to transmit and receive signals in a third frequency band. In some embodiments, the third frequency band may comprise the 3300-4200 MHz frequency range or a portion thereof.

In the depicted embodiment, the arrays of low-band radiating elements, the arrays of first mid-band radiating elements, and the arrays of second mid-band radiating elements are all part of the passive antenna assembly 190, while the array of high-band radiating elements 1195 are part of the active antenna module 110. It will be appreciated that the types of arrays included in the passive antenna assembly 190, and/or the active antenna module 110 may be varied in other embodiments.

It will also be appreciated that the number of linear arrays of low-band, mid-band and high-band radiating elements may be varied from what is shown in the figures. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently. As one specific example, two linear arrays of second mid-band radiating elements may be replaced with four linear arrays of ultra-high-band radiating elements that transmit and receive signals in a 5 GHz frequency band.

Each array 220 of low-band radiating elements 222 may be used to form a pair of antenna beams, namely an antenna beam for each of the two polarizations at which the dual-polarized radiating elements are designed to transmit and receive RF signals. Likewise, each array of first mid-band radiating elements, and each array of second mid-band radiating elements may be configured to form a pair of antenna beams, namely an antenna beam for each of the two polarizations at which the dual-polarized radiating elements are designed to transmit and receive RF signals. Each linear array may be configured to provide service to a sector of a base station. For example, each linear array may be configured to provide coverage to approximately 1200 in the azimuth plane so that the base station antenna 100 may act as a sector antenna for a three-sector base station. Of course, it will be appreciated that the linear arrays may be configured to provide coverage over different azimuth beamwidths. While all of the radiating elements can be dual-polarized radiating elements in the depicted embodiments, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

RF connectors or "ports" 140 (FIG. 1) can be mounted in the bottom end cap 130 that are used to couple RF signals from external remote radio units (not shown) to the arrays of the passive antenna assembly 190. Two RF ports can be provided for each array, namely a first RF port 140 that couples first polarization RF signals between the remote radio unit and the arrays and a second RF port 140 that couples second polarization RF signals between the remote radio unit and the arrays. As the radiating elements can be slant cross-dipole radiating elements, the first and second polarizations may be a −45° polarization and a +45° polarization.

A phase shifter may be connected to a respective one of the RF ports 140. The phase shifters may be implemented as, for example, wiper arc phase shifters such as the phase shifters disclosed in U.S. Pat. No. 7,907,096 to Timofeev, the disclosure of which is hereby incorporated herein in its entirety. A mechanical linkage may be coupled to a RET actuator (not shown). The RET actuator may apply a force to the mechanical linkage which in turn adjusts a moveable element on the phase shifter in order to electronically adjust the downtilt angles of antenna beams that are generated by the one or more of the low-band or mid-band linear arrays.

It should be noted that a multi-connector RF port (also referred to as a "cluster" connector) can be used as opposed to individual RF ports 140. Suitable cluster connectors are disclosed in U.S. patent application Ser. No. 16/375,530, filed Apr. 4, 2019, the entire content of which is incorporated herein by reference.

The radiating elements 220 can be dipole elements configured to operate in some or all the 617-960 MHz frequency band. Further discussions of example antenna elements including antenna elements comprising feed stalks can be found in U.S. Provisional Patent Application Ser. Nos. 63/087,451 and 62/993,925 and/or related utility patent applications claiming priority thereto, the contents of which are hereby incorporated by reference as if recited in full herein.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.)

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The term "about" used with respect to a number refers to a variation of +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a base station antenna housing comprising a front radome and a rear;

a passive antenna assembly in the base station antenna housing;

a plurality of struts that are longitudinally spaced apart inside the base station antenna housing, wherein at least some struts of the plurality of struts comprise a forward arm and a rearward arm, each of the forward and rearward arms extending laterally across the base station antenna housing; and a matching layer coupled to at least one of the forward arm or the rearward arm of at least a first strut of the plurality of struts.

2. The base station antenna of claim 1, further comprising a reflector inside the base station antenna housing, wherein at least some struts of the plurality of struts are coupled to the reflector.

3. The base station antenna of claim 2, wherein the reflector comprises left and right side reflector strip segments that extend in a longitudinal direction along a portion of a length of the base station antenna housing, and wherein the rearward arm of at least the first strut of the plurality of struts is attached to the left and right side reflector strip segments.

4. The base station antenna of claim 2, wherein the reflector comprises right and left side U-shaped segments, and wherein the rearward arm of the first of the plurality of struts is attached to the right and left side U-shaped segments.

5. The base station antenna of claim 4, wherein the rearward arm of the first of the plurality of struts comprises a lip that extends rearwardly, and wherein one side of the U-shaped segments extends forward and is coupled to the lip.

6. The base station antenna of claim 1, wherein the matching layer comprises a first matching layer and a second matching layer, and wherein the first matching layer is coupled to the forward arm of at least the first strut of the plurality of struts and the second matching layer is coupled to the rearward arm of at least the first strut of the plurality of struts.

7. The base station antenna of claim 1, wherein the forward arm and/or the rearward arm of the first of the plurality of struts comprises a laterally extending slot, and wherein the at least one matching layer extends through the laterally extending slot.

8. The base station antenna of claim 1, wherein the matching layer is provided as a plurality of matching layer segments arranged in rows, columns or rows and columns.

9. The base station antenna of claim 1, wherein the rearward arm of at least the first strut of the plurality of struts comprises a plurality of laterally spaced apart open channels, and wherein the base station antenna further comprises a plurality of substrates comprising a plurality of longitudinally spaced apart conductive members, one substrate coupled to each set of longitudinally aligned open channels of the plurality of laterally spaced apart open channels.

10. The base station antenna of claim 9, wherein one of the plurality of laterally spaced apart open channels of the rearward arm of at least the first strut of the plurality of struts comprises laterally extending attachment features that couple to one substrate of the plurality of substrates.

11. The base station antenna of claim 9, wherein the conductive members are planar and define parasitic tuning elements.

12. The base station antenna of claim 1, wherein each strut of the first plurality of struts have a unitary body with a closed outer perimeter that provides the forward arm and the rearward arm and an open center space residing between the forward arm and the rearward arm in a front-to-back direction of the base station antenna housing.

13. The base station antenna of claim 1, further comprising at least one frequency selective surface (FSS) that is inside the base station antenna housing and that is configured to reflect or block electromagnetic waves from radiating elements of the passive antenna assembly and allow higher band electromagnetic waves to travel therethrough toward the front radome.

14. The base station antenna of claim 13, further comprising an active antenna unit coupled to the base station antenna housing, wherein the active antenna unit comprises an array of radiating elements facing the FSS, and wherein the array of radiating elements of the active antenna unit are configured to propagate RF energy through the FSS and the base station antenna housing.

15. A base station antenna assembly comprising:

a base station antenna housing having a front radome;

a plurality of columns of first radiating elements configured for operating in a first operational frequency band inside the base station antenna housing, each column of first radiating elements comprising a plurality of first radiating elements arranged in a longitudinal direction;

a first plurality of struts that are longitudinally spaced apart inside the base station antenna housing, wherein the first plurality of struts extend across a width of the base station antenna housing; and a second plurality of struts that are longitudinally spaced apart inside the base station antenna housing and positioned below the first plurality of struts, wherein the second plurality of struts extend across the width of the base station antenna, and wherein the first plurality of struts have a different configuration than the second plurality of struts.

16. The base station antenna assembly of claim 15, wherein each of the first plurality of struts comprise a forward arm and a rearward arm spaced apart with an open space therebetween and each strut of the first plurality of struts have a unitary body with a closed outer perimeter that surrounds the open space and provides the forward arm and the rearward arm, and wherein each of the forward and rearward arms extend laterally across the base station antenna housing.

17. The base station antenna assembly of claim 16, wherein the first plurality of struts support a first matching layer and a second matching layer, wherein the forward arm supports the first matching layer and the rearward arm supports the second matching layer.

18. The base station antenna assembly of claim 16, wherein the forward arm comprises a plurality of laterally spaced apart coupling segments, the base station antenna further comprising a first matching layer that comprises a plurality of laterally spaced apart fastener segments that couple to the coupling segments.

19. The base station antenna assembly of claim 16, wherein the forward arm and/or the rearward arm comprises a laterally extending slot, and wherein at least one matching layer extends through the laterally extending slot of the first plurality of struts and terminates above the second plurality of struts.

20. The base station antenna assembly of claim 15, wherein the first plurality of struts support at least one matching layer.

21. The base station antenna assembly of claim 15, further comprising a plurality of longitudinally extending substrates, each substrate comprising a plurality of conductive members that are longitudinally spaced apart, wherein each substrate is coupled to the first plurality of struts and terminates above the second plurality of struts.

22. The base station antenna assembly of claim 15, further comprising a reflector in the base station antenna housing, wherein the reflector comprises a right side U-shaped segment and a left side U-shaped segment, and wherein a rearward arm of at least one of the first plurality of struts is attached to the right side U-shaped segment and the left side U-shaped segment, wherein the rearward arm of the at least one of the first plurality of struts comprises a right side lip and a left side lip that each extend rearwardly, and wherein one side of the right side U-shaped segment extends forward and is coupled to the right side lip and one side of the left side U-shaped segment extends forward and is coupled to the left side lip.

23. The base station antenna assembly of claim 15, further comprising a frequency selective surface (FSS) that resides behind a first matching layer and the plurality of columns of first radiating elements, wherein the FSS is configured to reflect electromagnetic waves within the first operational frequency band, wherein the FSS is further configured such that electromagnetic waves within a second operational frequency band propagate through the FSS, wherein the second operational frequency band is higher than the first operational frequency band, and wherein a plurality of columns of second radiating elements configured to operate in the second operational frequency band are provided by an active antenna unit coupled to the base station antenna housing.

24. A base station antenna, comprising:

a base station antenna housing comprising a front radome and a rear;

a passive antenna assembly in the base station antenna housing; and a plurality of struts that are longitudinally spaced apart inside the base station antenna housing, wherein the plurality of struts each comprise a closed outer perimeter with a forward arm and a rearward arm connected by a right side segment and a left side segment, with the forward arm in front of the rearward arm and with the forward arm being parallel to the rearward arm, and wherein each of the forward arm and the rearward arm extend laterally across the base station antenna housing.

25. The base station antenna of claim 24, further comprising a plurality of first matching layer segments that are coplanar, wherein at least first and second side-by-side first matching layer segments are coupled to the forward arm of at least two longitudinally adjacent struts of the plurality of struts.

26. The base station antenna of claim 24, wherein each of the plurality of struts comprise a unitary body providing the forward arm and the rearward arm with the unitary body surrounding an open center space that is bounded by right and left sides of the unitary body and the forward arm and the rearward arm.

* * * * *